July 1, 1969 E. M. IDELSON 3,453,107
NOVEL PHOTOGRAPHIC PRODUCTS, PROCESSES AND COMPOSITIONS
Filed Sept. 13, 1965
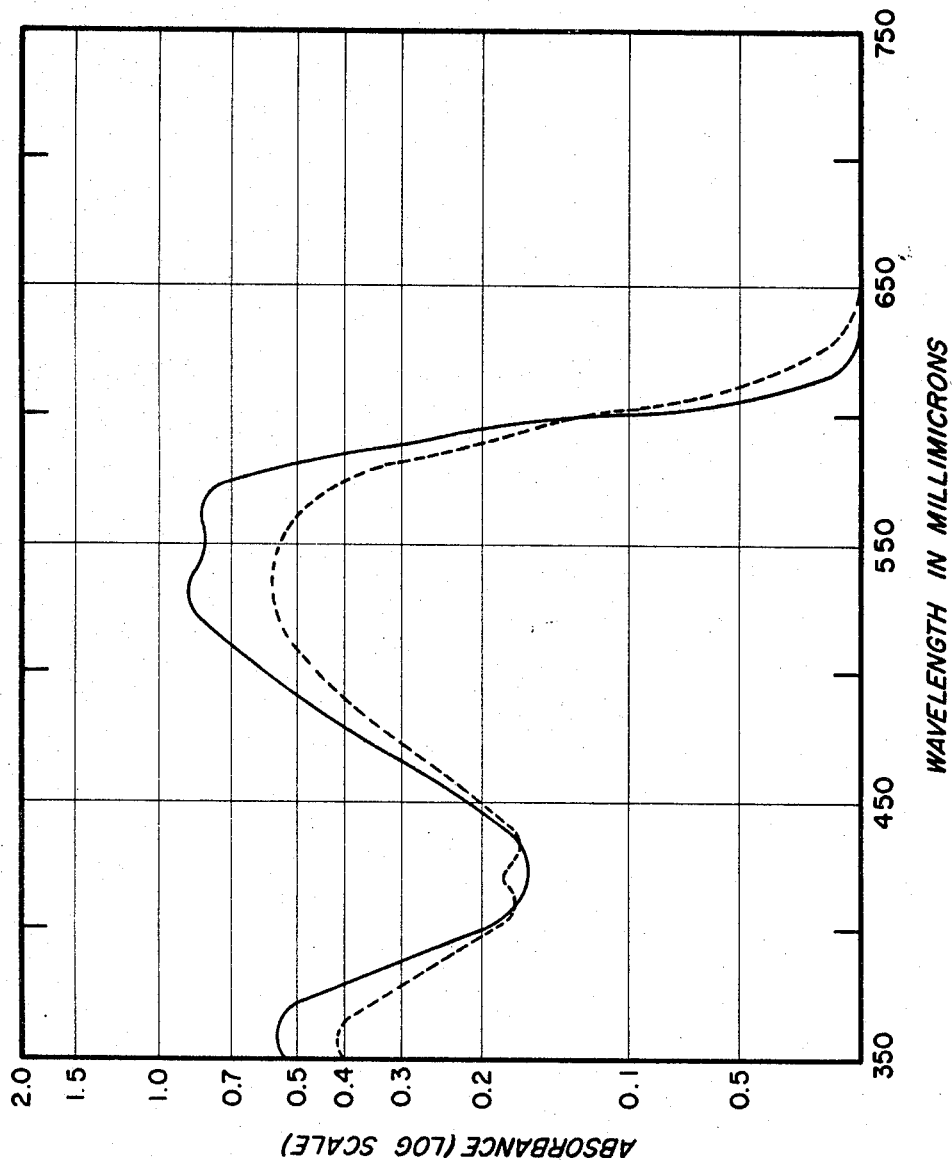
INVENTOR
Elbert M. Idelson
BY Brown and Mikulka
and
Alvin Isaacs
ATTORNEYS

United States Patent Office 3,453,107
Patented July 1, 1969

---

3,453,107
NOVEL PHOTOGRAPHIC PRODUCTS, PROCESSES AND COMPOSITIONS
Elbert M. Idelson, Newton Lower Falls, Mass., assignor to Polaroid Corporation, Cambridge, Mass., a corporation of Delaware
Filed Sept. 13, 1965, Ser. No. 486,853
Int. Cl. G03c *5/54, 5/30, 7/00*
U.S. Cl. 96—29          29 Claims

ABSTRACT OF THE DISCLOSURE

Color photographic diffusion transfer systems utilizing 1:1 chrome-complexed dyes which are also silver halide developing agents, and novel dyes and dye developers which may be used in preparing these complexes.

---

This invention relates to novel metal-dye complexes and, more particularly, to a novel class of chromium-complexed dyes and to photographic products, compositions and processes employing the same.

A primary object of this invention, therefore, is to provide novel metal-dye complexes.

Another object is to provide a novel class of chromium-complexed dyes.

Still another object is to provide a novel class of metal-complexed dyes containing a single co-ordinated metal atom per molecule of dye.

Yet another object is to provide a novel class of dyes of the foregoing description which are also silver halide developing agents.

A further object is to provide novel photographic products, processes and compositions employing the same to prepare color images.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein:

The figure is a graphic illustration comparing the spectrophotometric curves of the chromium-complexed dyes of this invention with related chromium-complexed dyes.

The metal-dye complexes to which this invention is directed are 1:1 chromium-complexed dyes, i.e., dyes containing a single co-ordinated chromium atom per molecule of dye. More specifically, the novel metal-complexed dyes of this invention are 1:1 chromium-complexed dyes within one of the following formulae:

(A)
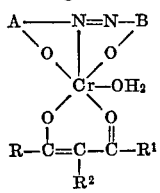

and (B)
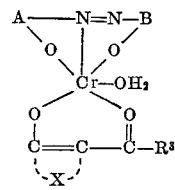

wherein A is an aromatic radical, e.g., a phenyl or naphthyl radical; B is an aromatic or heterocyclic radical, e.g., a phenyl, naphthyl or pyrazolone radical, said

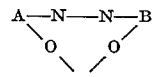

comprising the radical of an ortho, ortho'-dihydroxy-azo dye of the formula:

(C)        $\underset{\underset{OH}{|}}{A}-N=N-\underset{\underset{OH}{|}}{B}$

X represents the atoms necessary to complete an aliphatic, aromatic or heterocyclic ring; R and $R^1$ are an alkyl radical, preferably lower alkyl, including fluoro-substituted and alkoxy-substituted derivatives thereof, an aryl, e.g., a phenyl radical, or a phenylamino radical, and may be the same or different; $R^2$ may be hydrogen or a lower alkyl or phenyl radical; and $R^3$ may be a lower alkyl radical, hydroxyl, or hydrogen, provided that where X represents the atoms necessary to complete an aromatic ring, $R^3$ is hydrogen or lower alkyl.

In addition to the large number of ortho, ortho'-dihydroxy-azo dyes heretofore known in the art, the class of dyes within the scope of Formula C further includes novel dyes wherein the aromatic radical A contains a cyano substituent, a substituent of the formula:

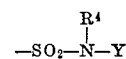

or a substituent of the formula:

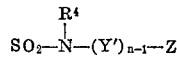

wherein $R^4$ is hydrogen or a lower alkyl radical; Y is an alkyl radical, preferably an alkyl radical containing from 1–5 carbon atoms, e.g., methyl, ethyl, propyl, isopropyl, etc., provided that when $R^4$ is alkyl, said $R^4$ and Y moieties together may comprise the carbon atoms necessary to form a 5 or 6 member ring, e.g., a sulfonpiperidide substituent; Y' is phenylene, phenalkylene, or alkylene; the alkylene moiety preferably being lower alkylene, as noted above; n is a positive integer from 1 to 2, inclusive; and Z is a dihydroxyphenyl silver halide developing radical, e.g., a hydroquinonyl radical. The latter class of novel dyes containing a dihydroxyphenyl silver halide developing radical are per se useful in photographic processes for preparing color images, as will be discussed hereinafter.

The novel dyes containing one of the aforementioned substituents have been found to exhibit spectral absorption characteristics which render them particularly useful in color photography wherein faithful color reproduction of the original subject matter is desired.

A preferred group of azo dyes within the scope of Formula C are hydroxynaphthylazo-pyrazolones. Included within the scope of such dyes are those novel dyes containing the aforementioned substituents. Particularly useful are those hydroxynaphthylazo-pyrazolones wherein the aforementioned substituents are bonded directly to the naphthyl nucleus para to the azo substituent. These latter classes of compounds, which, when complexed with chromium have been found to provide magenta dyes exhibiting excellent spectral absorption characteristics for color photography, may be represented by the following formulae:

(D)
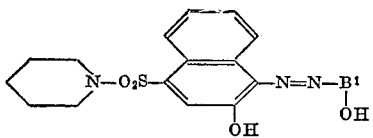

(E)
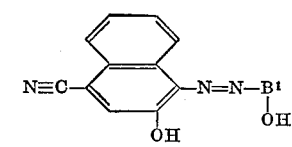

(F)
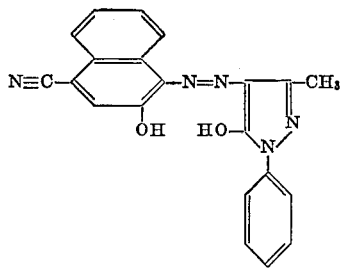

and (G)
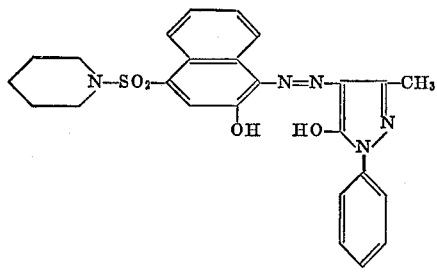

wherein $B^1$ is a pyrazolone radical.

As examples of these and other useful dyes, mention may be made of the following:

(1)
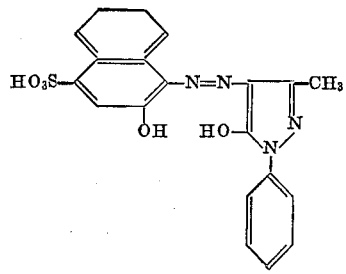

(2)

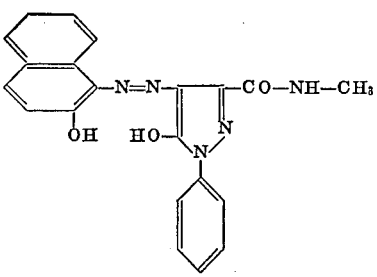

(3)

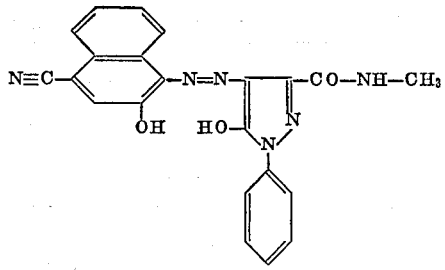

(4)
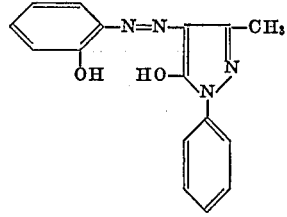

(5)
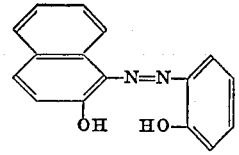

(6)
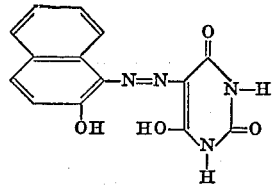

(7)
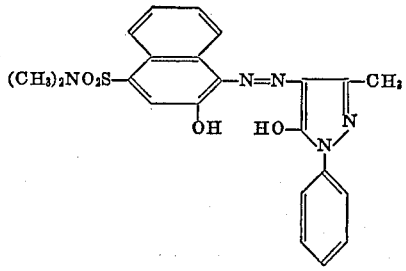

(8)

(9)

(10)
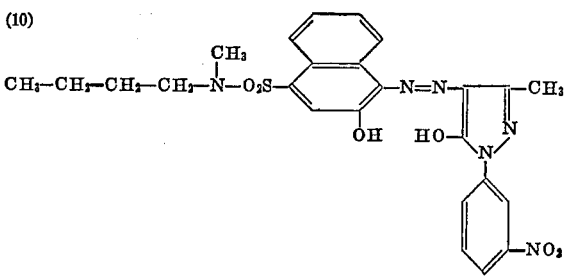

(11) 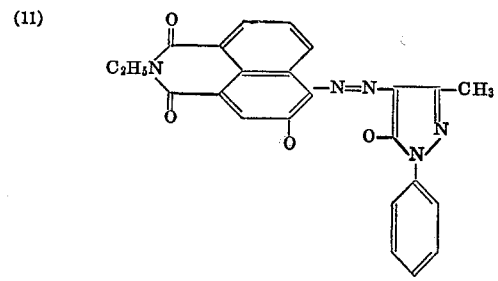
(11a) 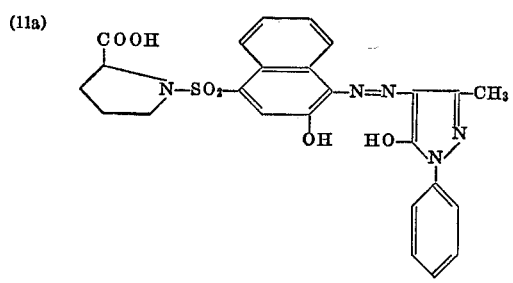
(11b) 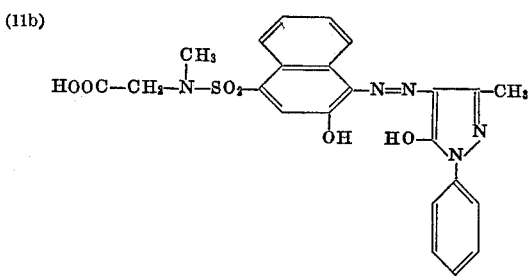
(12) 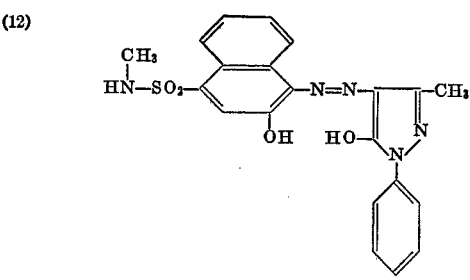
(13) 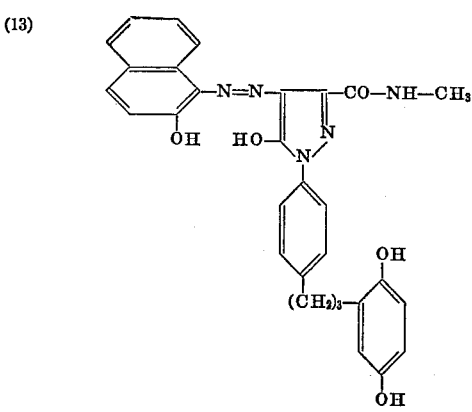
(14) 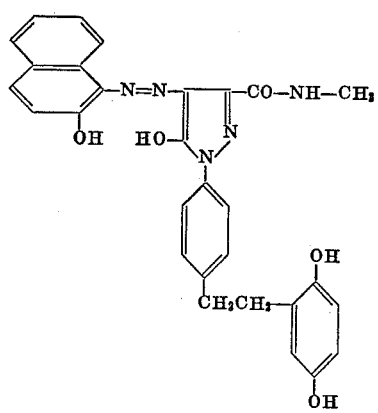
(15) 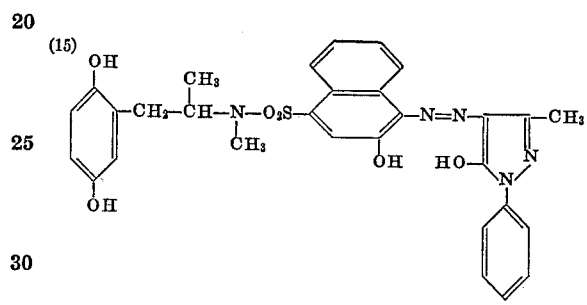
(16) 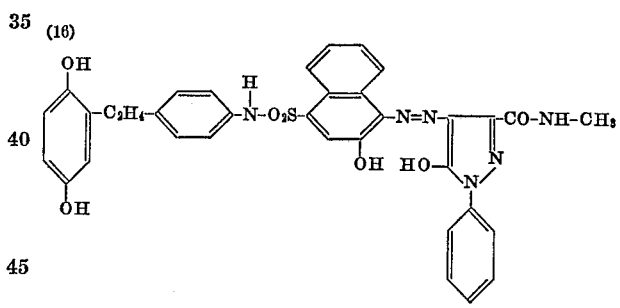
(17) 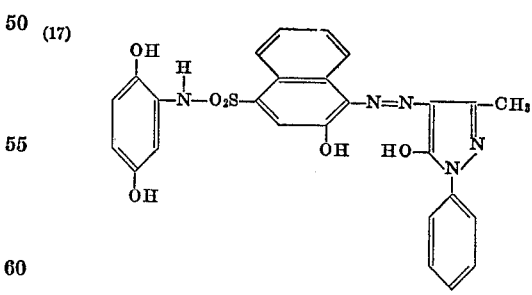
(18) 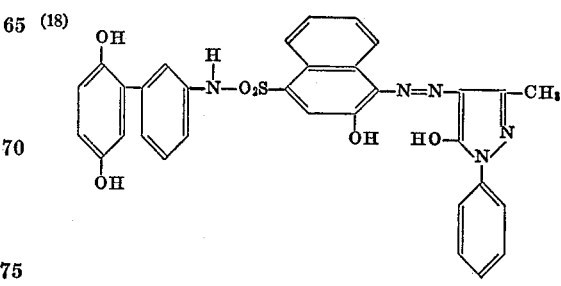

(19) 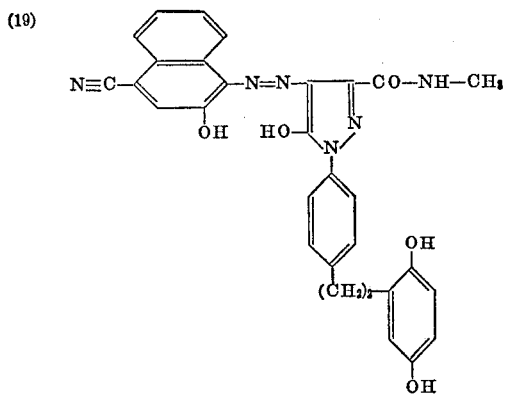

(20) 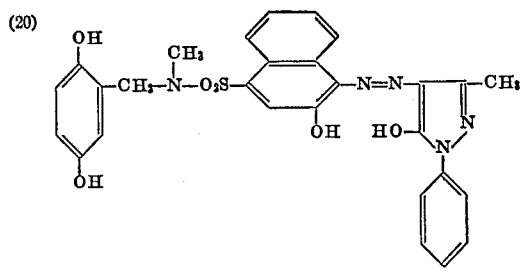

(21) 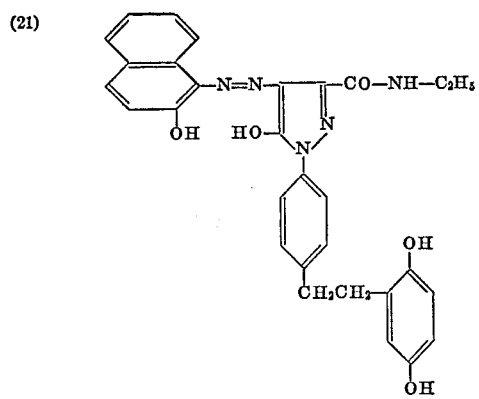

(22) 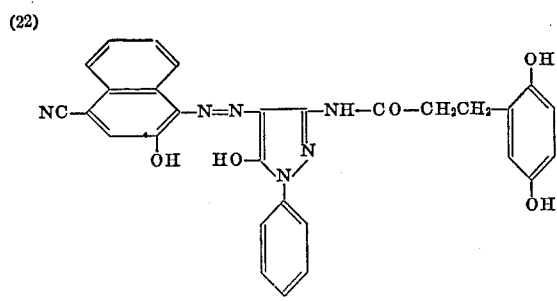

(23) 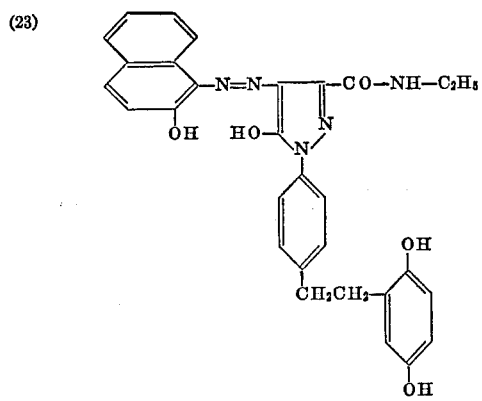

(24) 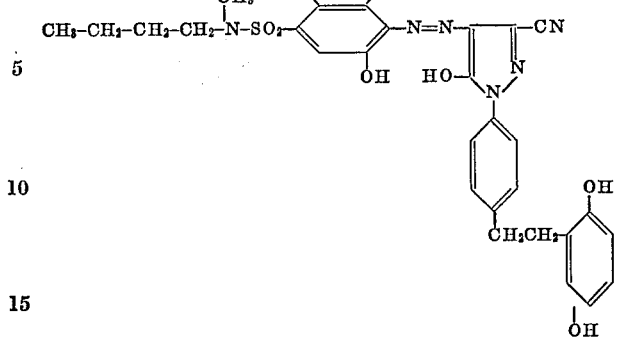

(25) 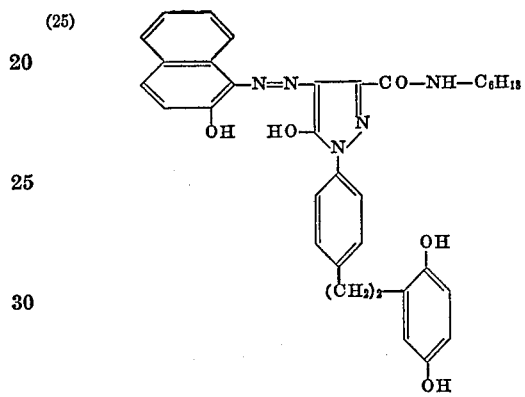

It will be noted that compounds 12–25 are dye developers, i.e., dyes which contain a silver halide developing radical, e.g., a dihydroxyphenyl radical such as a hydroquinonyl group, and hence are both dyes and silver halide developing agents. As examples of other useful dye developers within the scope of Formula C, mention may be made of the dye developers described and claimed in copending application Ser. No. 359,998 filed Apr. 15, 1964, which is a continuation-in-part of Ser. No. 788,893 filed Jan. 26, 1959, and now abandoned. Compounds of this nature and the metal complexes thereof will be discussed wih more particularity hereinafter.

The ligands or compounds contributing the two oxygen atoms bonded to the chromium atom may be defined as β-hydroxy-α,β-unsaturated carbonyl compounds, or compounds capable of tautomerizing to such a structure. These compounds may be represented by the following formulae:

(H) 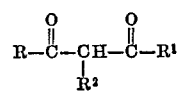

and (I) 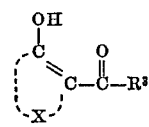

wherein R, $R^1$, $R^2$, $R^3$ and X have the meanings heretofore noted.

A preferred ligand is:

(26) 

acetylacetone

As examples of other preferred ligands permitting formation of the novel 1:1 chromium-complexed dyes of Formulae A and B, mention may be made of the following:

(27) CH₃—CH₂—C(O)—CH₂—C(O)—CH₃

(28) CH₃—CH₂—C(O)—CH₂—C(O)—CH₂—CH₃

(29) CF₃—C(O)—CH₂—C(O)—CF₃

(30) C₆H₅—NH—C(O)—CH₂—C(O)—CH₃

(31) CH₃—C(O)—CH₂—C(O)—CF₃

(32) 2-hydroxy-4-methoxybenzaldehyde (OH, CHO, OCH₃ on benzene)

(33) salicylaldehyde (OH, CHO on benzene)

(4) cyclohexyl—C(O)—CH₃ (2-acetylcyclohexanone)

(34a) CH₃O—CH₂—C(O)—CH₂—C(O)—CH₃

(34b) 2-acetylcyclopentanone

As examples of 1:1 chromium-complexed dyes within the scope of this invention, mention may be made of the following:

(35) [Chromium complex dye structure with piperidino-SO₂-naphthyl-N=N-pyrazole ligand and acetylacetonate, with H₂O–Cr, CH₃—C=CH—C(O)—CH₃]

(36) [Chromium complex dye structure with piperidino-N-O₂S-naphthyl-N=N-pyrazole(CH₃, phenyl) ligand with H₂O–Cr and 2-hydroxy-4-methoxybenzaldehyde ligand (OCH₃)]

(37) [Chromium complex dye structure with CH₃HN—O₂S-naphthyl-N=N-pyrazole(CH₃, phenyl) ligand with H₂O–Cr and CH₃—C=CH—C(O)—CH₃]

(38) [Chromium complex dye structure with piperidino-N-O₂S-naphthyl-N=N-pyrazole(CH₃, phenyl) ligand with H₂O–Cr and C₆H₅—NH—C=CH—C(O)—CH₃]

(39) [Chromium complex dye structure with naphthyl-N=N-pyrazole(CO—NH—CH₃, phenyl) ligand with H₂O–Cr, CH₃—C=CH—C(O)—CH₃ and (CH₂)₃-dihydroxyphenyl substituent]

(40) 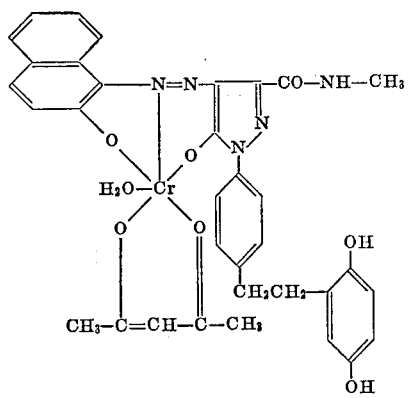
(41) 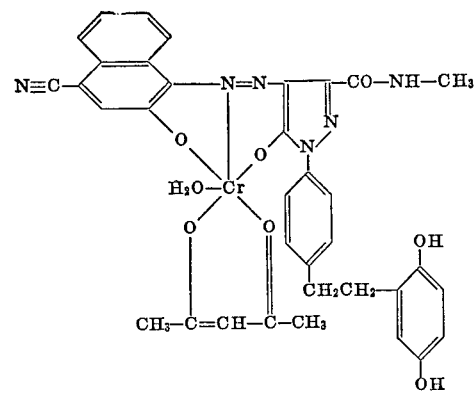
(42) 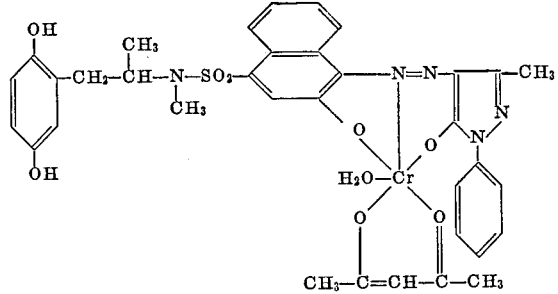
(43) 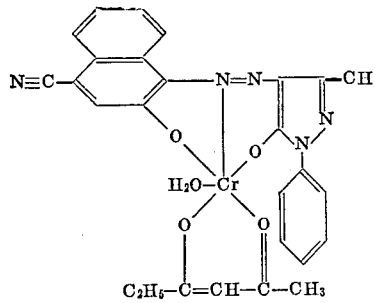
(44) 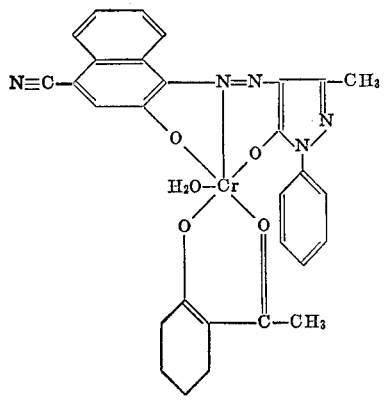
(45) 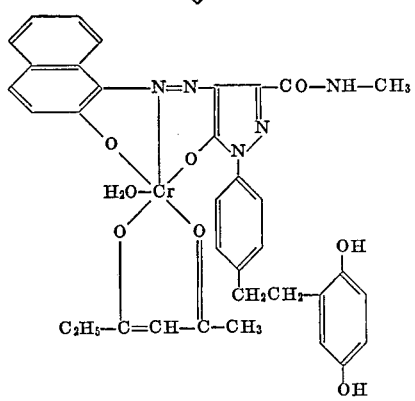
(46) 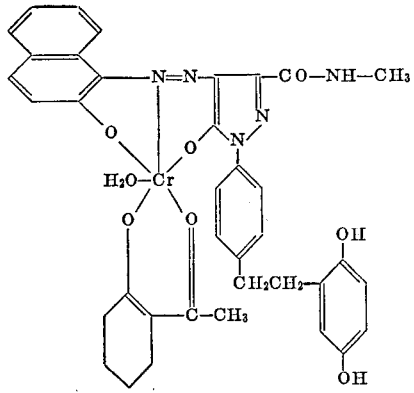
(47)
(48) 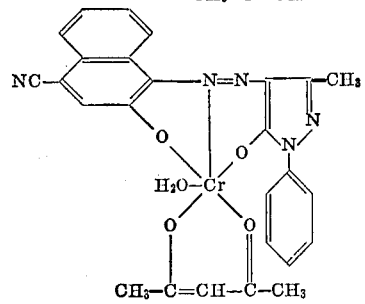

13 14
(49) 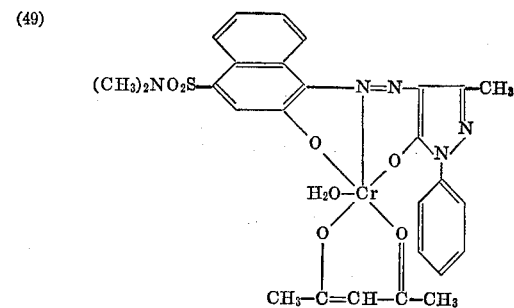
(50) 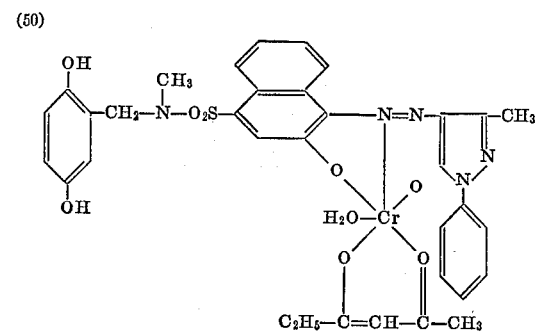
(51) 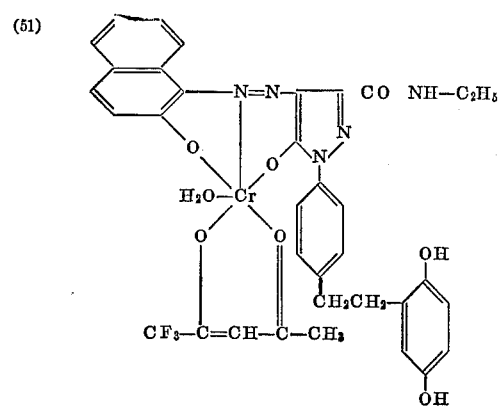
(52) 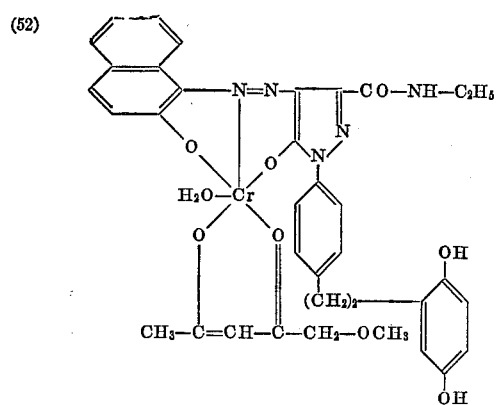
(53) 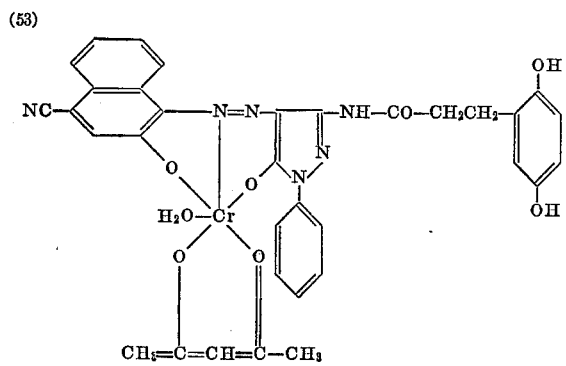
(54) 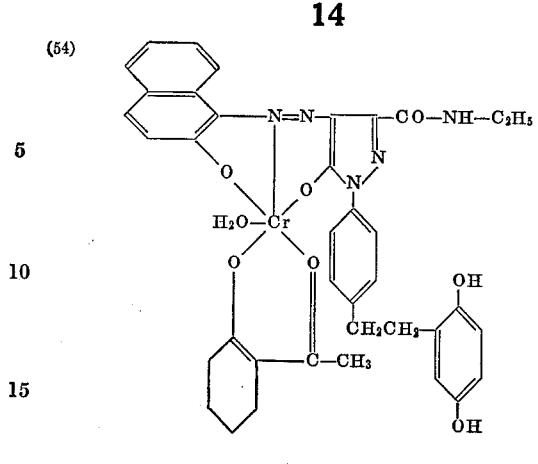
(55) 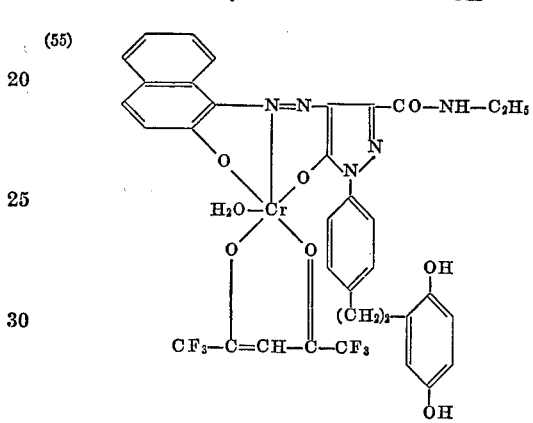
(56) 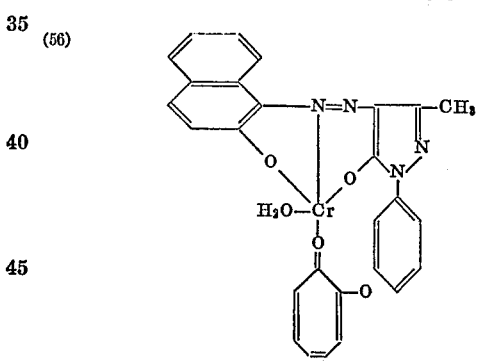
(57) 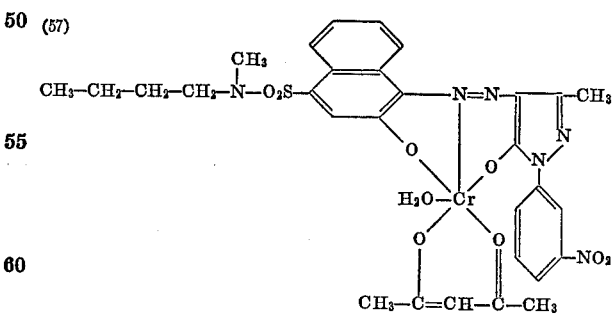
(58) 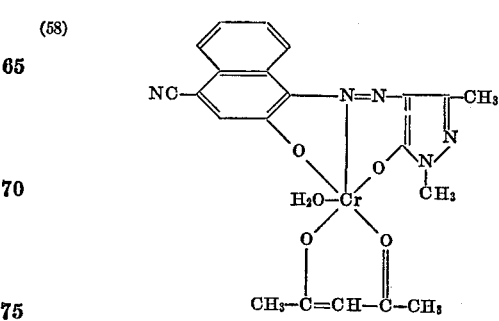

(59)
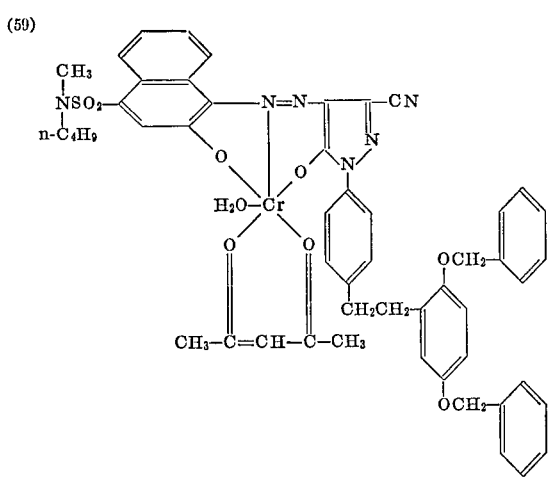

(60)
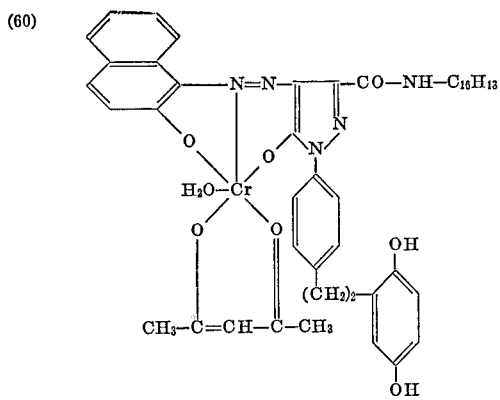

(61)
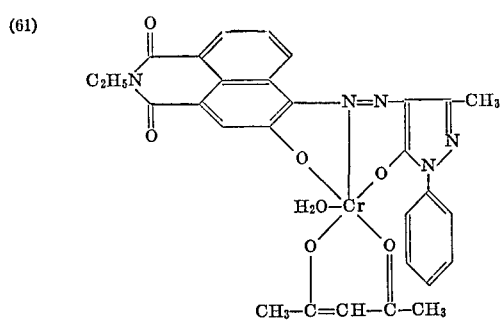

A preferred method of preparing the novel metal-complexed dyes of this invention comprises reacting the non-complexed dye, i.e., a dye of Formula C, with the desired ligand of Formula H or I, e.g., a ligand of Formulae 26–34, and a suitable inorganic chromic salt, e.g., chromic acetate. The reaction may be effected by refluxing a mixture of the above-mentioned ingredients in a suitable inert organic solvent such as dimethylformamide.

Other useful chromic salts and inert organic solvents will be readily apparent to those skilled in the art.

It will be appreciated that, as used herein, the term "inert organic solvent" denotes an organic solvent which is chemically inert to both the reactants and the reaction product.

Following complexing, appropriate reactions may be performed on the dye molecule, if desired, to form a 1:1 chrome-complexed analogue thereof.

The novel chromium-complexed dyes of this invention may also be prepared by converting a chrome-complexed dye, e.g., Inochrome Pink N (CI 1876) to a chrome-complexed dye having the desired chemical and/or physical properties, followed by complexing with the desired ligand to provide a chrome-complexed dye of Formula A or B.

They may also be prepared by converting the complex of a metal other than chromium to the desired chrome-complexed dye.

The following examples show by way of illustration and not by way of limitation the preparation of the novel chrome-complexed dyes of this invention.

EXAMPLE 1

20.0 g. of Inochrome Pink N, a chrome-complexed dye of the formula:

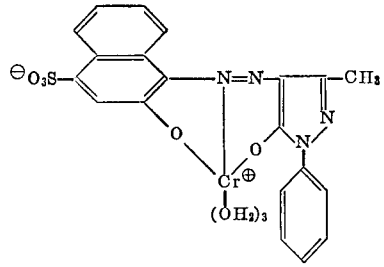

was mixed with 10.0 ml. of dimethylformamide and 100.0 ml. of methylene chloride. The mixture was stirred for forty-five minutes while passing phosgene over the surface, after which the methylene chloride was evaporated. 100.0 ml. of methylene chloride was then added and evaporated again. 10.0 ml. of ethanol was then added, followed by 100.0 ml. of methylene chloride and 30.0 ml. of piperidine. After one hour the product was isolated by pouring into water and evaporating the methylene chloride. The product was reprecipitated from acetone into water. After washing with dilute sodium hydroxide, there was recovered 7.0 g. of the sulfonpiperidide of Inochrome Pink N having the formula:

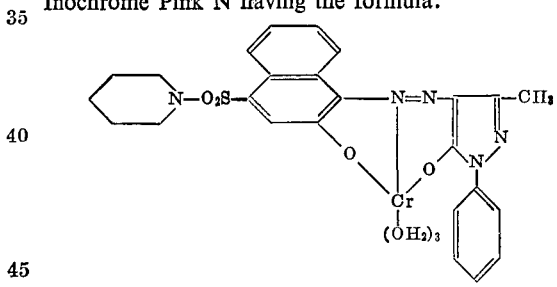

2.0 g. of the above-mentioned compound was refluxed with 2.0 g. of acetylacetone in 10.0 ml. of ethanol for 1½ hours. The mixture was then poured into a saline and sulfuric acid solution to provide the chrome-complex of Formula 35:

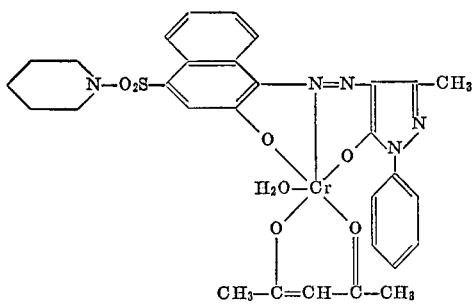

having a $\lambda_{max.}$ at 522 m$\mu$ and 556 m$\mu$ in methyl cellosolve; $\epsilon = 22,000$; 22,600.

EXAMPLE 2

1.2 g. of the sulfonpiperidide of Inochrome Pink N [prepared as in Example 1] was heated with 3.0 ml. of 5-methoxysalicylaldehyde and 10.0 ml. of dimethylformamide on a steam bath for thirty minutes. The resulting product was isolated by electrophoresis on a JKM Stubbings continuous electrophoresis apparatus as the neutral component. Concentration of the eluate and precipitation into water yielded the chrome-complexed dye of Formula 36:

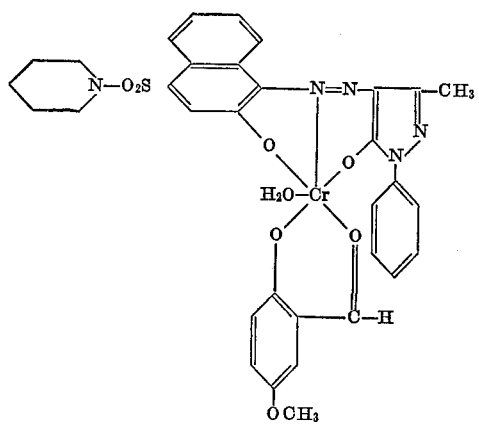

having a $\lambda_{max.}$ at 531 m$\mu$ and 566 m$\mu$ in methyl cellosolve; $\epsilon$=18,600 and 15,300.

EXAMPLE 3

10.0 g. of 1-phenyl-3-methyl-4-[4'-chlorosulfonyl-2'-acetoxy-naphthalene-1-azo]-5-pyrazolone of the formula:

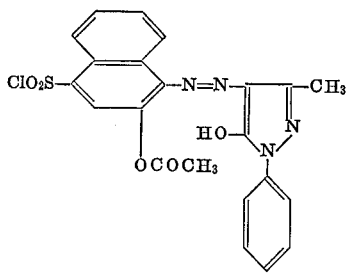

was mixed with 10.0 ml. of 40% aqueous methyl amine and the mixture was stirred for one hour. It was then poured into 400.0 ml. of water and acidified with hydrochloric acid. The resulting solid was collected and crystallized from acetone, yielding 6.7 g. of 1-penyl-3-methyl-4-[4'-N-methylsulfonamido-2'-naphthol-1'-azo]-pyrazolone, M.P. 233–234° C., having the following formula:

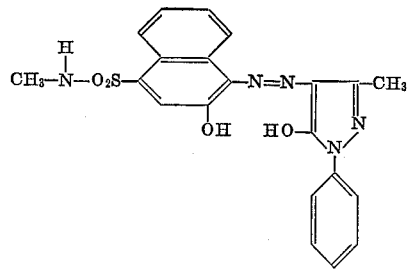

11.7 g. of the above dye was mixed with 150.0 ml. of dimethylformamide, 30.0 g. of acetylacetone and 30.0 g. of chromic acetate and the resulting mixture was boiled for ten minutes and then poured into 600.0 ml. water. The resulting solid was collected and boiled with 75.0 ml. of acetone to yield 4.5 g. of the crystalline dye of Formula 37:

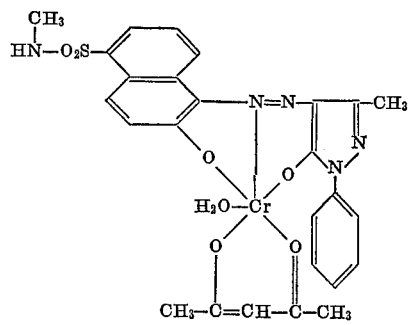

having a $\lambda_{max.}$ at 527 m$\mu$ and 565 m$\mu$ in methyl cellosolve; $\epsilon$=17,800; 19,600.

EXAMPLE 4

By substituting acetoacetanilide for 5-methoxysalicylaldehyde in the procedure of Example 2, the chrome-complexed dye of Formula 38 was prepared:

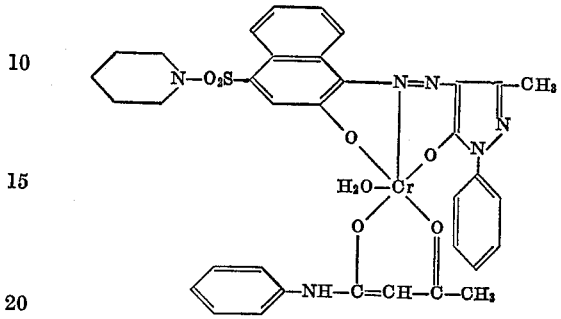

having a $\lambda_{max.}$ at 563 m$\mu$ and 527 m$\mu$ in methyl cellosolve; $\epsilon$=18,000; 17,400.

EXAMPLE 5

20.0 g. of benzenesulfonazide was dissolved in 50.0 ml. of tetrahydrofuran; the resulting solution was cooled to about 0° C. and flushed with nitrogen. To this solution was added dropwise over a period of one hour, while maintaining the reaction at 0–5° C. and under a blanket of nitrogen, a mixture of 5.0 g. (50% in oil) of sodium hydride and 46.2 g. of a pyrazolone of the formula:

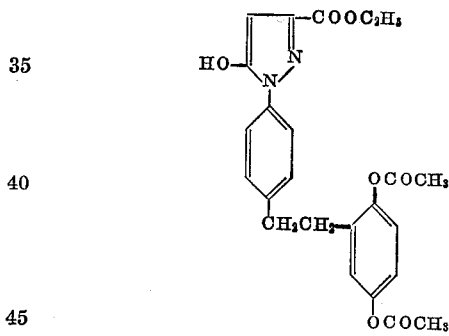

in 1.5 liter of tetrahydrofuran. [The entire system must be protected from air by the nitrogen screen.] After the dropwise addition was complete, the mixture was stirred in an ice bath under the blanket of nitrogen for one-half hour. A solution of 14.0 g. of $\beta$-naphthol in 50.0 ml. of tetrahydrofuran was added and the resulting mixture was stirred under nitrogen one hour at room temperature after which it was acidified with 21.0 g. of p-toluene sulfonic acid. The mixture was then filtered and the filtrate was concentrated in vacuo to about 150.0 ml., cooled and 17.1 g. of a crystalline orange dye was recovered having a melting point of 168–172° C. and the following structural formula:

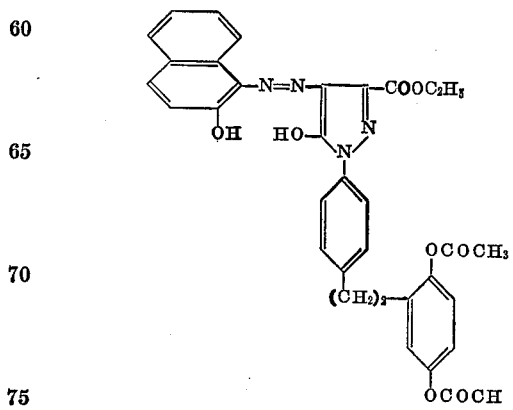

15.0 g. of this dye was mixed with 200.0 ml. of methanol and the resulting solution was flushed with nitrogen. 40.0 ml. of 40% aqueous monomethyl amine was added and the mixture was refluxed on a steam bath for three hours. It was then acidified with ethanolic hydrochloric acid to yield a viscous oil which solidified upon standing. This solid was filtered and thoroughly washed with water. It was then recrystallized from 600.0 ml. of ethyl acetate to yield 9.47 g. of a dye developer, M.P. 164–166° C., having the following formula:

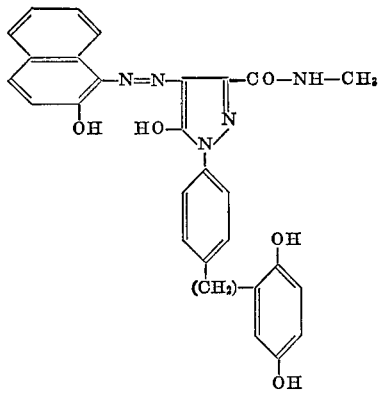

6.7 g. of this dye developer and 13.0 g. of acetyl acetone were dissolved in 10.0 ml. of dimethylformamide and the resulting solution was flushed with nitrogen. 12.7 g. of finely powdered chromic acetate was dissolved in 60.0 ml. of boiling dimethylformamide and this hot solution was added to the dye developer solution. The resulting mixture was then heated to reflux under nitrogen and refluxed for 15–20 minutes. It was then cooled and poured in a thin stream with vigorous stirring into 600.0 ml. of water containing 10.0 ml. of concentrated hydrochloric acid. This mixture was then filtered and the solid washed thoroughly with water and crystallized from 400.0 ml. of acetone to yield 6.95 g. of metalized dye developer of Formula 40:

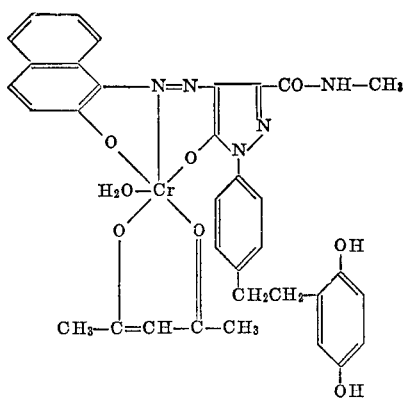

having a $\lambda_{max}$ at 520 m$\mu$ and 555 m$\mu$ in methyl Cellosolve; $\epsilon$=17,000; 20,500.

EXAMPLE 6

143.0 g. of $\alpha$-naphthylamine was dissolved in 250.0 ml. of dimethylformamide and this solution was added with stirring to 294.0 ml. of hydrochloric acid in 3000 ml. of water. The resulting white precipitate ($\alpha$-naphthylamine hydrochloride) was cooled to 0° C. in a Dry Ice, methanol-in-water cooling bath. 69.0 g. of sodium nitrite in 750.0 ml. of water was then added with vigorous stirring while maintaining the temperature at 0–2° C. The resulting dark brown diazonium solution was stirred for ten minutes while maintaining the temperature between 0–2° C., and the solution was then filtered. A second (coupler) solution was prepared by dissolving in 15 liters of acetone a pyrazolone of the formula:

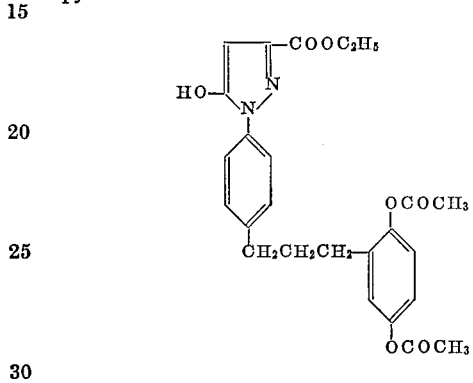

and then adding 336.0 g. of sodium bicarbonate and enough ice to maintain the temperature at 10° C. The dark brown diazonium solution prepared above was then added to the second (coupler) solution while stirring over a thirty minute period while maintaining the temperature at 10° C. The resulting mixture was then stirred for an additional ninety minutes. A red-orange solid was collected on a Buchner funnel, washed by trituration (at room temperature) with 3 liters of 1:1 acetone-water solution, 3 liters of water and 2 liters of isopropanol. It was then dried overnight in a vacuum oven at 40° C. to obtain 518.0 g. of a red-orange solid of the formula:

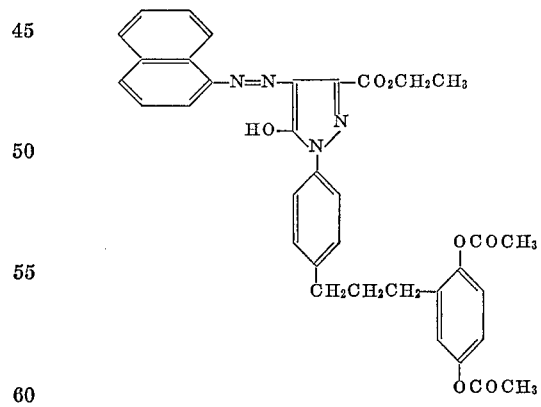

A mixture of 57.8 g. of the above dye, 25.0 g. of cupric acetate and 1000.0 ml. of dimethylformamide was stirred at room temperature until solution was complete. The reaction mixture was then filtered and the filtrate cooled to 0° C. with Dry Ice, water and methanol cooling bath. 25.0 ml. of hydrogen peroxide (30% solution) was added with stirring at such a rate as to maintain the temperature of the reaction of 0–2° C., while the cooling bath was maintained at approximately —5° C. The mixture was then stirred at 0–2° C. for an additional hour and then precipitated with vigorous stirring into 3 liters of 0.2% hydrochloric acid. The resulting solid was then collected on a Buchner funnel, washed with water by trituration and dried under vacuum at room temperature to a constant weight to yield 48.0 g. of a copper complex of the formula:

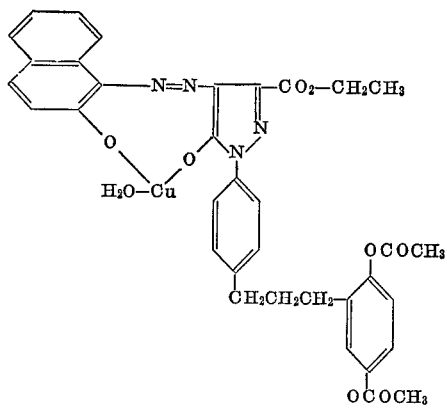

22.0 g. of the above copper complex dye was dissolved in 330.0 ml. of dimethylformamide and the resulting solution was then filtered to remove trace amounts of undissolved material. 5.5 g. of dithiooxamide was added with stirring and the resulting mixture was then stirred at room temperature for an additional hour. The reaction mixture was then filtered to remove the copper complex of dithiooxamide formed in the preceding step. The filtrate was then precipitated by adding slowly to a vigorously stirred 0.1% hydrochloric acid solution. The resulting brick-red solid was collected on a Buchner funnel, washed with water by trituration, collected and dried overnight at room temperature under vacuum to yield 19.1 g. of a dye of the formula:

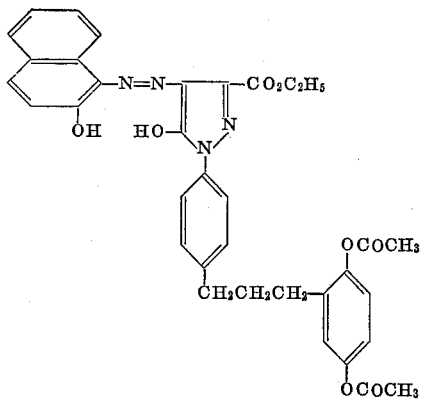

Reaction of the above dye with aqueous monomethylamine followed by acidification with ethanolic hydrochloric acid in the manner described in Example 5 yielded a dye developer of the formula:

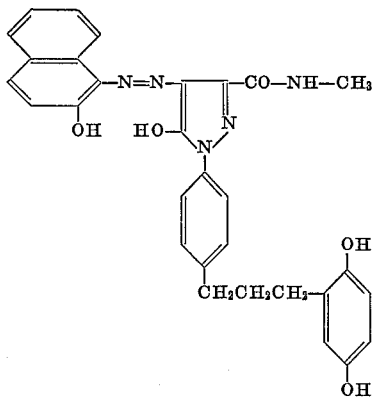

A treatment of the above dye developer with acetyl acetone and chromic acetate in the manner described in Example 5 yielded the metalized dye developer of Formula 39:

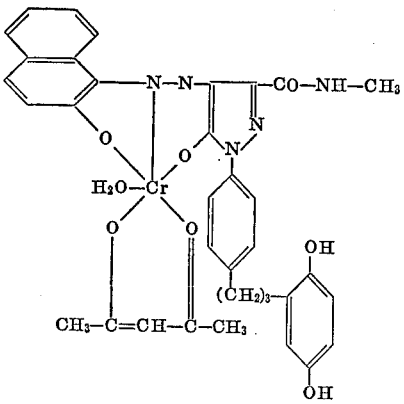

having a $\lambda_{max.}$ at 520 m$\mu$ and 534 m$\mu$ in methyl Cellosolve; $\epsilon$=16,400; 19,400.

EXAMPLE 7

5.0 g. of 4-cyano-naphthalene-1-diazo-2-oxide was added to a solution of 14.0 g. of 1-[p-(2′,5′-diacetoxyphenethyl)-phenyl]-3-carbethoxy-5-pyrazolone in 100.0 ml. of ethanol, 250.0 ml. of water and 5.0 g. of sodium carbonate. The mixture was warmed to about 30° C. and after one hour it was acidified with hydrochloric acid to yield a gummy product which was then dissolved in 200.0 ml. of ethanol and refluxed under nitrogen with 50.0 ml. of 40% aqueous methyl amine for two hours. It was then cooled and neutralized with 20.0 ml. of hydrochloric acid in 50.0 ml. of ethanol. Crystallization from methyl cellosolve and water gave 3.6 g. of a dye developer of the formula:

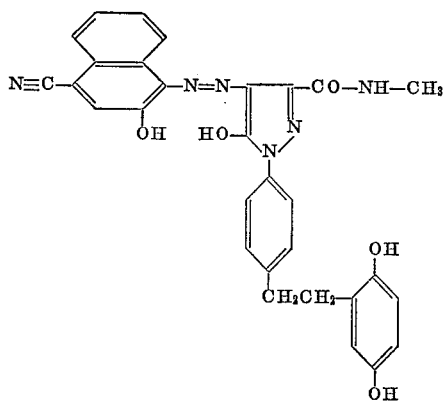

3.0 g. of the above dye developer, 5.6 g. of chromic acetate and 14.0 g. of acetylacetone in 60.0 ml. of dimethylformamide was refluxed for twenty minutes. The mixture was then poured into 600.0 ml. of water containing 10.0 ml. of hydrochloric acid. The solution was collected and stirred with 100.0 ml. of acetone. About 50.0 ml. methanol was added after two hours and the resulting product was filtered and washed with methylene chloride to yield 1.5 g. of the metallized dye developer of Formula 41:

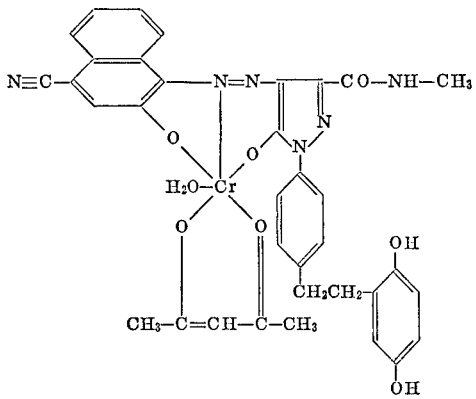

having a $\lambda_{max.}$ at 536 m$\mu$ and 576 m$\mu$ in methyl Cellosolve; $\epsilon$=21,000; 25,400.

EXAMPLE 8

55.6 g. of 4-amino-1-naphthalene sulfonic acid was dissolved in 700.0 ml. of water and 20.0 g. of 50% aqueous sodium hydroxide. 17.5 g. of sodium nitrite was added while stirring until the solution was complete. The resulting solution was then added dropwise while stirring over a period of ten minutes to a mixture of 83.5 ml. of concentrated hydrochloric acid, 100.0 ml. of water and enough ice to keep the temperature below 5° C. The resulting yellow diazonium salt was added dropwise with stirring over a period of thirty minutes to a mixture of 43.5 g. of 1-phenyl-3-methyl-5-pyrazolone, 160.0 ml. of pyridine, 200.0 ml. of water, 500.0 ml. of ethanol and enough ice to keep the temperature of the reaction mixture below 5° C. After stirring for an additional fifteen minutes, the reaction product was filtered by suction and the filtrate was discarded. The precipitate was washed with water to remove the pyridine and then dried in a vacuum oven. Recrystallization from 3000.0 ml. of 50% methyl cellosolve and water yielded 89.4 g. of 1-phenyl-3-methyl-4-[4'-naphthalene sulfonic acid-1'-azo]-5-pyrazolone, $\lambda_{max.}$ in methyl cellosolve=435 m$\mu$, having the following structural formula:

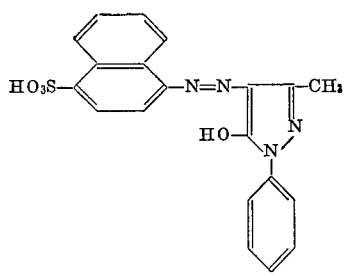

24.5 g. of the last-mentioned pyrazolone, 12.5 g. of phosphorus pentachloride and 100.0 ml. of 1,1,2-trichloroethane were refluxed five hours and the reaction mixture was filtered while hot to yield 16.0 g. of red-orange crystals, M.P. 243–247° C. Recrystallization from toluene yielded 11.5. g. of 1-phenyl-3-methyl-4-[4'-naphthalene sulfonyl chloride-1'-azo]-5-pyrazolone, $\lambda_{max.}$=422 m$\mu$; $\epsilon$=28,200, having the following structural formula:

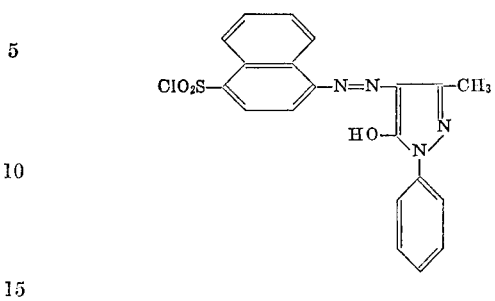

34.4 g. of the last-mentioned pyrazolone [prepared in the foregoing manner] 100.0 ml. of pyridine and 19.8 ml. of 2-N-methylamino-[2',5'-dimethoxyphenyl]-propane were stirred at room temperature for forty-five minutes. The mixture was then heated on a steam bath for 1½ hours. It was then poured slowly with stirring into diluted hydrochloric acid and ice, filtered and dried in a vacuum oven to yield 49.0 g. of product. This product was recrystallized from 150.0 ml. of acetic acid and dried in a vacuum oven at 50° C. to yield 23.9 g. of an azo dye, M.P. 148–150° C., $\lambda_{max.}$=428 m$\mu$; $\epsilon$=23,000, of the formula:

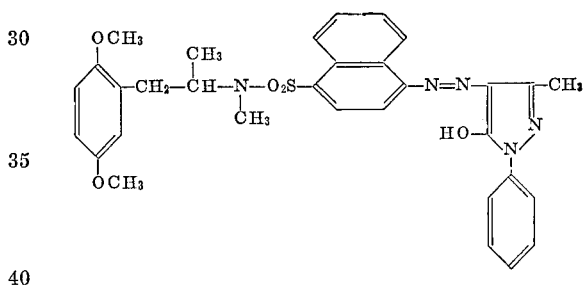

22.3 g. of this azo dye was dissolved in 160.0 ml. of trichloromethane and to the resulting mixture was added dropwise at room temperature while stirring over a period of thirty minutes, 22.0 ml. of boron tribromide in 60.0 ml. of trichloromethane. The resulting mixture was stirred for an additional hour, during which a red precipitate was formed. 100.0 ml. of methanol was added dropwise with stirring and the reaction mixture was then heated over a steam bath for two hours. The resulting orange precipitate was filtered and dried to yield 15.0 g. of a dye developer, M.P. 249–250° C., $\lambda_{max.}$=425 m$\mu$; $\epsilon$=23,200, of the formula:

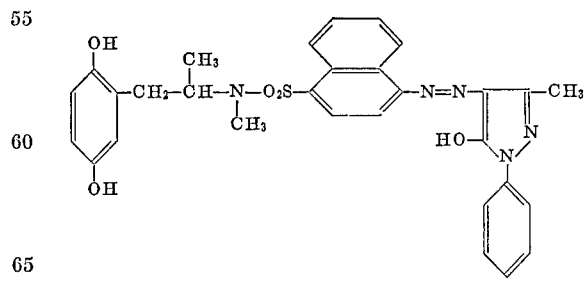

A mixture of 15.0 g. of the last-mentioned compound, 30.0 ml. of acetic anhydride, 2.0 ml. of pyridine and 120.0 ml. of dimethylformamide were heated over a steam bath while stirring for two hours. The reaction mixture was then allowed to stand overnight. The resulting bright orange crystals were filtered and washed with dilute hydrochloric acid and water. They were then dried over potassium hydroxide in vacuo to yield 13.7 g. of bright orange crystals, M.P. 195–197° C.; $\lambda_{max.}=426$ m$\mu$; $\epsilon=23,600$, of the formula:

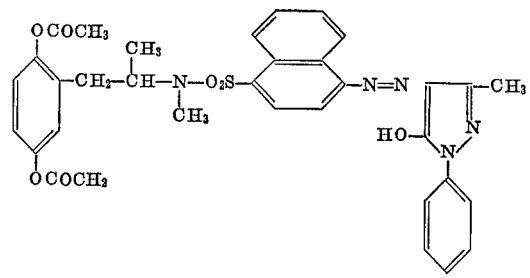

12.0 g. of the last-mentioned material were dissolved in 160.0 ml. of dimethylformamide and 140.0 ml. of tetrahydrofuran. To this was added a solution of 5.47 g. of cupric acetate in 160.0 ml. of dimethylformamide. The above mixture was chilled to 4° C., and to it was then added 22.46 g. (20.0 ml.) of 30% hydrogen peroxide. After thorough stirring, the mixture was precipitated into 400.0 ml. of 3 N hydrochloric acid and ice, filtered and washed with water. The resulting solid was dried overnight over potassium hydroxide in vacuo to yield 10.0 g. of a dye, M.P. 80–100° C., of the formula:

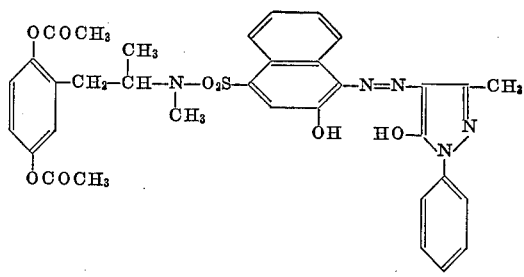

A mixture of 4.0 g. of the last-mentioned material, 60.0 ml. of deaerated methyl cellosolve and 4.0 ml. of 50% aqueous sodium hydroxide was stirred at room temperature under a blanket of nitrogen for forty-five minutes. Then 20.0 ml. of concentrated hydrochloric acid in 20.0 ml. of water was added with cooling and stirring. The resulting red-orange precipitate was filtered and dried over phosphorus pentoxide overnight, then washed with 100.0 ml. of boiling trichloroethane to yield 3.0 g. of a dye developer; M.P. 233–235° C.; $\lambda_{max.}=474$ m$\mu$; $\epsilon=23,800$, of the formula:

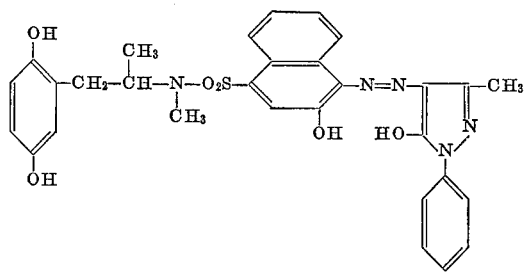

2.76 g. of this dye developer and 4.70 g. of acetyl acetone were dissolved in 9.0 ml. of dimethylformamide. 4.3 g. of chromium acetate was dissolved in 20.0 ml. of boiling dimethylformamide and then added to the above solution. The resulting mixture was heated to reflux for fifteen to twenty minutes, precipitated into diluted hydrochloric acid and ice and then washed thoroughly with water. It was then dissolved in 30.0 ml. of hot methanol, cooled, filtered and evaporated to dryness. The residue was extracted in a Soxhlet extractor with methylene chloride and the extracts were cooled and filtered to yield the chrome-complexed dye developer of Formula 42:

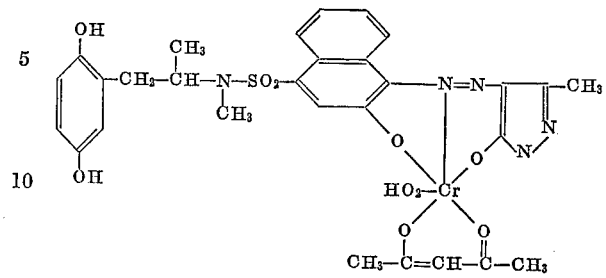

having a $\lambda_{max.}$ at 530 m$\mu$ and 565 m$\mu$ in methyl cellosolve; $\epsilon=21,500; 22,700$.

The remaining illustrative chrome-complexed dyes [Formulae 43–61] were prepared in the manner described in the foregoing examples.

The spectral absorption characteristics of these chrome-complexed dyes in methyl cellosolve are set forth in the following table:

TABLE 1

| Formula No. | $\lambda_{max.}$ | $\epsilon$ |
|---|---|---|
| 43 | 537 | 21,400 |
|  | 575 | 23,800 |
| 44 | 536 | 22,600 |
|  | 574 | 24,800 |
| 45 | 520 | 17,000 |
|  | 555 | 20,400 |
| 46 | 520 | 16,900 |
|  | 554 | 20,000 |
| 47 | 525 |  |
|  | 558 |  |
| 48 | 537 | 22,000 |
|  | 575 | 24,600 |
| 49 | 530 | 21,400 |
|  | 567 | 23,200 |
| 50 | 530 | 18,300 |
|  | 565 | 18,800 |
| 51 | 534 | 12,400 |
|  | 558 | 12,800 |
| 52 | 520 | 16,300 |
|  | 556 | 19,500 |
| 53 | 543 | 23,600 |
|  | 572 | 21,300 |
| 54 | 520 | 16,600 |
|  | 554 | 19,800 |
| 55 | 535 | 19,400 |
|  | 562 | 17,600 |
| 56 | 535 | 20,400 |
|  | 575 | 22,000 |
| 57 | 530 | 16,800 |
|  | 567 | 18,400 |
| 58 | 531 | 18,800 |
|  | 569 | 20,600 |
| 59 | 533 | 12,900 |
|  | 572 | 14,800 |
| 60 | 522 | 16,200 |
|  | 556 | 19,200 |
| 61 | 553 |  |
|  | 592 |  |

It will be noted that the dye and dye intermediates prepared in the foregoing illustrative examples are also novel compounds.

The novel chrome-complexed dyes of this invention exhibit markedly greater stability against the color degradation effects of actinic radiation, humidity and/or heat than do the non-complexed dyes.

In addition, the 1:1 complexes of this invention are purer in hue than the corresponding 2:1 complexes.

While the 1:1 chrome-complexed dyes of the present invention may be utilized in conventional processes for the dyeing of fabrics and the like, their extremely desirable spectral absorption characteristics make them particularly useful in photographic processes for preparing color images wherein faithful color reproduction is required. In other words, in addition to the advantages obtained by increased stability, in comparison with 2:1 chrome complexes, the novel 1:1 chrome-complexed dyes of this invention exhibit particularly sharp spectral absorption curves with minimal light absorption in unwanted regions of the spectrum and hence are especially useful in subtractive color photography to provide accurate color reproductions of the subject matter.

The above-noted advantages of the 1:1 chrome complexes of this invention over 2:1 chrome complexes of the same dye are exemplified in the illustrative drawing wherein the spectral absorption curve of the 1:1 complex of Formula 47 (solid line) and the spectral absorption curve of a 2:1 complex of the same dye (dotted line) are superposed. Note the higher extinction ($\epsilon$) within the desired wavelength of the 1:1 complex and the lesser absorption in unwanted regions of the spectrum. Similar comparisons of the other 1:1 complexes of this invention demonstrate analogous superiority of the 1:1 complexes of this invention.

The chrome-complexed dye developers of this invention, i.e., the chrome-complexed dyes containing a silver halide developing function, e.g., the dye developers of Formulae 39, 42, 45, 46, 50–55, and 59–60 are thus particularly useful in photographic processes for preparing color images such as described and claimed in U.S. Patent No. 2,983,606 isued to Howard G. Rogers. This patent relates to diffusion transfer processes wherein a photographic negative material, such as a photographic element comprising an exposed silver halide emulsion, is developed in the presence of a dye developer to impart to an image-receiving layer a reversed or positive dye image of the developed image by permeating into the emulsion layer a suitable liquid composition and bringing the emulsion into superposed relationship with an appropriate image-receiving layer.

In carrying out such diffusion transfer processes, a photosensitive element containing a silver halide emulsion is exposed and wetted with a liquid processing composition, for example, by immersing, coating, spraying, flowing, etc. in the dark, and the photosensitive element superposed, prior to, during or after wetting, on an image-receiving element. In a preferred embodiment, the photosensitive element contains a layer of the dye developer and the liquid processing composition is applied to the photosensitive element in a uniform layer as the photosensitive element is brought into superposed position with the image-receiving element. The liquid processing composition permeates the emulsion to provide a solution of dye developer substantially uniformly distributed therein. As the exposed silver halide emulsion is developed, the oxidation product of the dye developer is immobilized or precipitated in the developed areas, thereby providing an imagewise distribution of unoxidized dye developer dissolved in the liquid processing composition. At least part of this imagewise distribution of unoxidized dye developer is transferred, by imbibition, to the superposed image-receiving layer. The image-receiving layer receives a depthwise diffusion, from the emulsion, of unoxidized dye developer without appreciably disturbing the imagewise distribution thereof to provide a reverse or positive colored image of the developed image. After a suitable imbibition period, say, for example, one minute, the positive image may be revealed by separating the image-receiving layer from the silver halide emulsion.

The chrome-complexed dye developers of this invention may be utilized in the photosensitive element, for example, in, on or behind the silver halide emulsion, or they may be utilized in the image-receiving element or in the liquid processing composition. In a preferred embodiment, a coating or layer of the dye developer is placed behind the sliver halide emulsion, i.e., on the side of the emulsion adapted to be located most distant from the photographed subject when the emulsion is exposed and preferably also adapted to be most distant from the image-receiving element when in superposed relationship therewith. In this preferred embodiment, the layer of dye developer may be applied by using a coating solution containing about 0.5 to 8% by weight of the dye developer. Similar concentrations may be used as the dye developer is utilized as a component of the liquid processing composition. In an especially useful mode of dispersing the dye developers in the photosensitive element, the dye developer is dissolved in a water-immiscible solvent and then dispersed in a gelatin coating composition.

The liquid processing composition comprises at least an aqueous solution of an alkaline compound, e.g., diethylamine, sodium hydroxide or sodium carbonate, and may contain the dye developer. In some instances, it may contain an additional silver halide developing agent. If the liquid composition is to be applied to the emulsion by being spread thereon, it may also include a viscosity-increasing compound such as hydroxyethyl cellulose or sodium carboxymethyl cellulose.

Useful opaque or transparent image-receiving elements are well known in the art. As examples of useful image-receiving materials, mention may be made of nylon, e.g., N-methoxymethyl-polyhexamethylene adipamide, polyvinyl alcohol, and gelatin, particularly polyvinyl alcohol or gelatin containing a dye mordant. Particularly useful are the image-receiving elements described and claimed in the copending application of Edwin H. Land, Ser. No. 234,864 filed Nov. 1, 1962, now U.S. Patent No. 3,362,819 issued Jan. 9, 1968.

The following examples show by way of illustration and not by way of limitation the use of the chrome-complexed dye developers of this invention in the aforementioned photographic processes for preparing color images.

EXAMPLE 9

A photosensitive element was prepared by coating a gelatin subcoated film base at a speed of 10 ft./minute with a solution comprising 0.47 g. of the chrome-complexed dye developer of Formula 39, dissolved in 7.5 cc. of 2% cellulose acetate hydrogen phthalate in acetone. After this coating dried, the green-sensitive silver iodobromide emulsion was coated on at a speed of 5 ft./minute and allowed to dry. This photosensitive element was exposed for one second and processed by spreading an aqueous processing composition between the thus-exposed photosensitive element and a superposed image-receiving element at a gap of 0.0026 in., said aqueous processing composition comprising:

| | | |
|---|---|---|
| Water | cc__ | 100.00 |
| KOH | g__ | 11.20 |
| Hydroxyethyl cellulose (high viscosity)[1] | g__ | 3.90 |
| Benzotriazole | g__ | 3.50 |
| Potassium thiosulfate | g__ | 0.50 |
| N-benzyl-α-picolinium bromide | g__ | 2.00 |
| Zinc nitrate | g__ | 0.50 |
| Lithium nitrate | g__ | 0.50 |
| 4'-methylphenyl-hydroquinone | g__ | 0.20 |

[1] Commercially available from Hercules Powder Co., under the trade name of "Natrosol 250."

The image-receiving element was prepared in accordance with the disclosure of the copending application of Edwin H. Land, Ser. No. 234,864, filed Nov. 1, 1962, now U.S. Patent No. 3,362,819, issued Jan. 9, 1968, and comprised a layer of a 2:1 mixture, by weight, of polyvinyl alcohol and poly-4-vinylpyridine, a layer of polyvinyl alcohol, and a layer of a half-butyl ester of poly-(ethylene/maleic anhydride) coated on a baryta paper support. After an imbibition period of approximately one minute, the image-receiving element was separated and contained a magenta positive image having a $D_{max.}$ of 2.19 and $D_{min.}$ of 0.31.

EXAMPLE 10

The above procedure was repeated substituting 0.55 g. of the chrome-complexed dye developer of Formula 40. A magenta positive image was obtained having a $D_{max.}$ of 1.81 and $D_{min.}$ of 0.40.

EXAMPLE 11

The procedure of Example 9 was repeated substituting 0.56 g. of the chrome-complexed dye developer of Formula 41. A magenta positive image was obtained having $D_{max.}$ of 2.00 and $D_{min.}$ of 0.78.

EXAMPLE 12

The procedure described in Example 9 was repeated, except that the dye developer was dispersed in a layer of gelatin. The coating solution from which the dye developer was coated was prepared from a solution of 0.5 g. of the dye developer, 2.25 cc. of triethylphosphate, 3.5 cc. of diethyllauramide, and 1.0 cc. of butyl alcohol. This solution was agitated in a Waring blendor for one minute with a solution of 10.0 g. of 10% gelatin solution, 2.6 cc. of water, and 2.0 cc. of Alkanol B. 5 cc. of the resulting dye dispersion was added to 2.5 cc. of water and 0.5 cc. of 12% aqueous saponin, and then coated on the gelatin subcoated film base at a speed of 10 ft./minute. After this coating dried, the green-sensitive silver iodobromide emulsion was coated on at a speed of 10 ft./minute and allowed to dry. Exposure and processing in the manner described in Example 9 gave a comparable magenta dye image.

As was mentioned previously, the dyes containing the substituent:

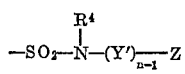

are per se novel dye developers. A preferred class of these novel dyes may be defined as ortho-hydroxynaphthylazopyrazolones of the formula:

(J)

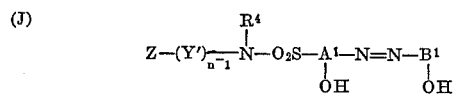

wherein —$A^1$— is a naphthylene radical; and

is a 5-pyrazolone radical, one nitrogen atom of said azo linkage being bonded to a carbon atom of the naphthylene nucleus ortho to the hydroxy substituent thereof, the other nitrogen atoms of said azo linkage being bonded to the pyrazolone nucleus in the 4 position.

Also novel per se are those ortho-hydroxynaphthylazopyrazolones in which the naphthyl nucleus contains a cyano, or a substituent of the formula:

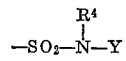

and the pyrazolone moiety contains a p-dihydroxyphenyl silver halide developing substituent. As noted from the illustrative compounds, this developing substituent may be present in a radical bonded to an atom of the pyrazolone nucleus in the 1 or 3 position.

This latter class of novel dye developers may be represented by the following formula:

(K)

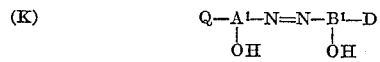

wherein —$A^1$— is a naphthylene radical;

is the divalent radical of a 5-pyrazolone substituent, one nitrogen atom of said azo linkage being bonded to a carbon atom of the naphthylene nucleus ortho to the hydroxy substitutent thereof, the other nitrogen atom of said azo linkage being bonded to the pyrazolone nucleus in the 4 position; Q is cyano, or a substitutent of the formula:

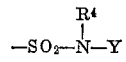

and D is a radical containing a p-dihydroxyphenyl substituent, e.g., a hydroquinonyl-lower alkylene-phenyl or hydroquinonyl-lower alkylene

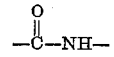

substituent, said radical D being bonded to an atom of the pyrazolone nucleus in the 1 or 3 position.

In addition to being useful in the preparation of chrome-complexed dyes affording the advantages discussed heretofore, including the increased stability to be described with more particularity hereinafter, the aforementioned novel classes of dye developers are also useful in their non-complexed form in the aforementioned photographic products, processes and compositions for forming color images.

As was mentioned previously, the novel chrome-complexed dyes of this invention exhibit increased stability against the color degradation effects of actinic radiation, humidity and/or heat than do the noncomplexed dyes.

Positive magenta dye images prepared in the manner described in Examples 9–11 were subjugated to fading tests in a temperate climate and the percent of fading was compared with that of a standard control magenta dye image. The following table illustrated the increased stability of the novel chrome-complexed dyes of this invention.

TABLE 2

| Dye developer | Percent of Fading in Sunlight | |
|---|---|---|
| | 700 Langleys [1] | 2,450 Langleys |
| Control | 72 | 80 |
| Formula 39 | 16 | 40 |
| Formula 40 | 1 | 14 |
| Formula 41 | 0 | 4 |

[1] Langleys=a unit of solar radiation equivalent to one gram calorie per square centimeter of irradiated surface.

The dye developers of this invention are also useful in integral multilayer photosensitive elements for use in multicolor diffusion transfer processes. As an example of such photosensitive elements, mention may be made of the photosensitive elements disclosed and claimed in the copending U.S. application of Edwin H. Land and Howard G. Rogers, Ser. No. 565,135, filed Feb. 13, 1956, now U.S. Patent No. 345,163, issued Oct. 3, 1967, wherein at least two selectively sensitized photosensitive strata are superposed on a single support and are processed, simultaneously and without separation, with a single common image-receiving element. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, a cyan dye developer, a magenta dye developer and a yellow dye developer. In one of the preferred embodiments of photosensitive elements of this type, the dye developers are disposed in separate alkali-permeable layers behind the photosensitive silver halide emulsion stratum with which they are associated.

The photosensitive elements within the scope of this invention may be used in film units which contain a plurality of photosensitive frames. The photosensitive elements of this invention are especially useful in composite roll film and film pack structures intended for use in a "Polaroid Land Camera," sold by Polaroid Corporation, Cambridge, Mass. 02139, or a similar camera structure such, for example, as the roll film type camera forming the subject matter of U.S. Patent No. 2,435,717, issued to Edwin H. Land on Feb. 10, 1948, or the film pack type camera shown in U.S. Patent No. 2,991,702, issued to Vaito K. Eloranta on July 11, 1961. In general, such composite roll films comprise a photosensitive roll, a roll of image-receiving material and a plurality of pods containing an aqueous alkaline processing solution. The rolls and pods are so associated with each other that, upon processing, the photosensitive element may be superposed on the image-receiving element and the pods may be ruptured to spread the aqueous alkaline processing solution between the superposed elements. The nature and construction of the pods used in such units are well known to the art. See, for example, U.S. Patents Nos. 2,543,181 and 2,634,886, issued to Edwin H. Land.

It will be noted that the liquid processing composition may contain one or more auxiliary or accelerating silver halide developing agents, such as p-methylaminophenol (Metol); 2,4 - diaminophenol (Amidol); benzylaminophenol; hydroquinones; a substituted hydroquinone such as toluhydroquinone, phenylhydroquinone, or 4'-methylphenylhydroquinone; or a 3-pyrazolidone such as 1-phenyl-3-pyrazolidone. These silver halide developing agents are substantially colorless, at least in their unoxidized form. It is possible that some of the dye developer oxidized in exposed areas may be oxidized by an energy transfer reaction with oxidized auxiliary developing agent.

In addition, development may be effected in the presence of an onium compound, particularly a quaternary ammonium compound, in accordance with the processes disclosed and claimed in U.S. Patent No. 3,173,786, issued to Milton Green and Howard G. Rogers, Mar. 16, 1965, and/or with a color coupler in accordance with the processes disclosed and claimed in the copending application of Howard G. Rogers, Ser. No. 455,302 filed May 12. 1965.

The dye developers of this invention may be used also in conventional photographic process, such as tray or tank development for conventional photosensitive films, plates or papers to obtain black-and-white, monochromatic or toned prints or negatives. By way of example, a developer composition suitable for such use may comprise an aqueous solution of approximately 1–2% of the dye developer, 1% sodium hydroxide, 2% sodium sulfite and 0.05% potassium bromide. After development is completed, any unreacted dye developer is washed out of the photosensitive element, preferably with an alkaline washing medium or other medium in which the unreacted dye developer is soluble. The expression "toned" is used to designate photographic images wherein the silver is retained with the precipitated dye, whereas "monochromatic" is intended to designate dye images free of silver.

It should be noted that the dye developers of this invention are self-sufficient to provide the desired color image and do not depend upon coupling reactions to produce the desired color.

It will be apparent that, by appropriate selection of the image-receiving element from among suitable known opaque and transparent maerials, it is possible to obtain either a colored positive reflection print or a colored positive transparency. Likewise, the inventive concepts herein set forth are adaptable for multicolor work by the use of special photographic materials, for example, film materials of the type containing two or more photosensitized elements associated with an appropriate number of image-receiving elements and adapted to be treated with one or more liquid processing compositions, appropriate dye developers suitable to impart the desired subtractive colors being incorporated in the photosensitized elements or in the liquid processing compositions. Examples of such photographic materials are disclosed in U.S. Patent No. 2,647,049 issued to Edwin H. Land.

As examples of useful image-receiving materials, mention may be made of nylon, e.g., N-methoxymethyl-polyhexamethylene adipamide, polyvinyl alcohol, and gelatin, particularly polyvinyl alcohol or gelatin containing a dye mordant such as poly-4-vinylpyridine. The image-receiving element also may contain a development restrainer, e.g., 1-phenyl-5-mercaptotetrazole, as disclosed in the copending application of Howard G. Rogers and Harriet W. Lutes, Ser. No. 50,849, filed Aug. 22, 1960, now U.S. Patent No. 3,265,498, issued Aug. 9, 1966.

The dye developers herein set forth are also useful in the formation of colored images in accordance with the photographic products and processes described and claimed in U.S. Patent No. 2,968,554, issued to Edwin H. Land on Jan. 17, 1961.

The novel compounds herein disclosed are also suitable for use as dyes for textile fibers, such as nylon.

In the preceding portions of the specification, the expression "color" has been frequently used. This expression is intended to include the use of a plurality of colors to obtain black.

Metal-complexed dyes, including 1:1 chrome-complexed dyes wherein the ligand moiety contains a radical comprising a silver halide developing substituent are described and claimed in the copending application of Elbert M. Idelson, Ser. No. 487,033 filed concurrently herewith.

Since certain changes may be made in the above products, compositions and processes without departing from the scope of the invention herein involved, it is intended that all matter contained in the above descripion shall be interpreted as illustrative and not in a limiting sense.

What is claimed is:

1. A photographic developer composition comprising an aqueous alkaline solution of a substantially colorless silver halide auxiliary developing agent and a compound selected from the group consisting of 1:1 chrome-complexed dyes of the formulae:

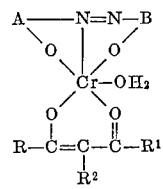

and

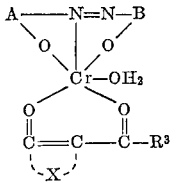

wherein

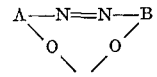

is the radical of an ortho, ortho'-dihydroxy azo dye of the formula:

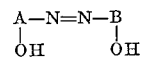

A is an aromatic radical selected from the group consisting of phenyl and naphthyl radicals; B is selected from the group consisting of aromatic and heterocyclic azo coupler radicals, at least one of said A and B moieties containing a silver halide developing radical; X represents the atoms necessary to complete a member of the group consisting of aliphatic, aromatic and heterocyclic rings; R and $R^1$ are each selected from the group consisting of alkyl, fluoroalkyl, alkoxyalkyl, aryl and phenylamino radicals; $R^2$ is selected from the group consisting of hydrogen and alkyl and phenyl radicals; and $R^3$ is selected from the group consisting of hydrogen and lower alkyl and hydroxyl radicals, provided that when X represents the atoms necessary to complete an aromatic ring, $R^3$ is selected from the group consisting of hydrogen and lower alkyl radicals.

2. A composition as defined in claim 1 wherein said complex is one within said first-mentioned formula, and B is a phenyl, naphthyl or pyrazolyl radical.

3. A composition as defined in claim 1 wherein said complex is one within said last-mentioned formula, wherein B is a phenyl, naphthyl or pyrazolyl radical; X represents the atoms necessary to complete a 5 or 6 member aliphatic ring or a benzene ring; and $R^3$ is hydrogen or methyl, provided that when X represents the atoms necessary to complete a benzene ring, $R^3$ is methyl.

4. A photographic product comprising a support, a silver halide emulsion in a layer on said support, and a 1:1 chrome-complexed dye developer in a layer on the same side of said support as said emulsion, said dye developer comprising a compound selected from the group consisting of 1:1 chrome-complexed dye developers within the formulae:

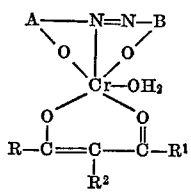

and

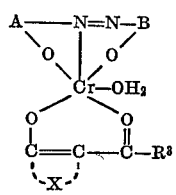

wherein

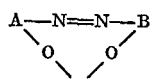

is the radical of an ortho, ortho'-dihydroxy azo of the formula:

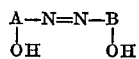

A is an aromatic radical selected from the group consisting of phenyl and naphthyl radicals; B is selected from the group consisting of aromatic and heterocyclic azo coupler radicals, at least one of said A and B moieties containing a silver halide developing radical; X represents the atoms necessary to complete a member of the group consisting of aliphatic, aromatic and heterocyclic rings; R and $R^1$ are each selected from the group consisting of alkyl, fluoroalkyl, alkoxyalkyl, aryl and phenylamino radicals; $R^2$ is selected from the group consisting of hydrogen and alkyl and phenyl radicals; and $R_3$ is selected from the group consisting of hydrogen and lower alkyl and hydroxyl radicals, provided that when X represents the atoms necessary to complete an aromatic ring, $R^3$ is selected from the group consisting of hydrogen and lower alkyl radicals.

5. A product as defined in claim 4 wherein said complex is one within said first-mentioned formula, and B is a phenyl, naphthyl or pyrazolyl radical.

6. A product as defined in claim 4 wherein said complex is one within said last-mentioned formula, wherein B is a phenyl, naphthyl or pyrazolyl radical; X represents the atoms necessary to complete a 5 or 6 member aliphatic ring or a benzene ring; and $R^3$ is hydrogen or methyl, provided that when X represents the atoms necessary to complete a benzene ring, $R^3$ is methyl.

7. A chrome-complexed dye developer as defined in claim 4 selected from the group consisting of:

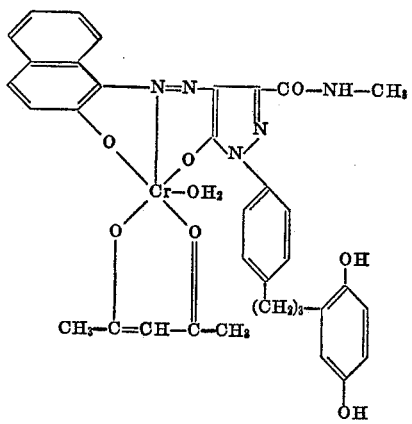

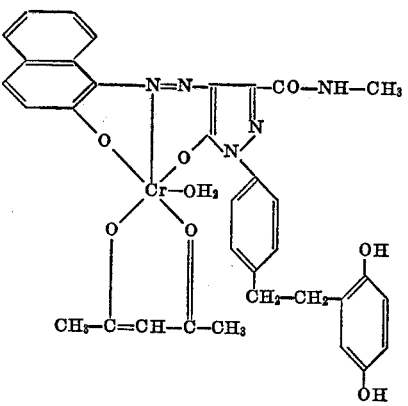

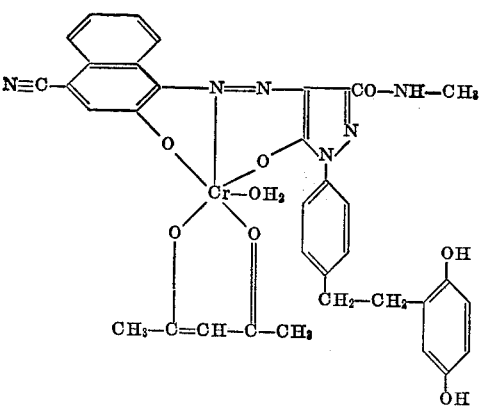

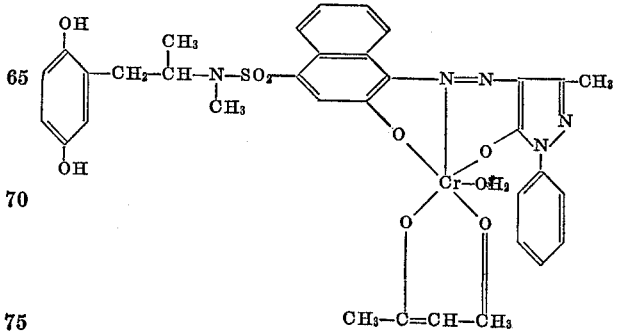

35 36
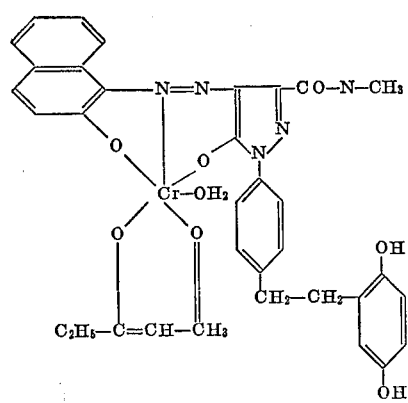
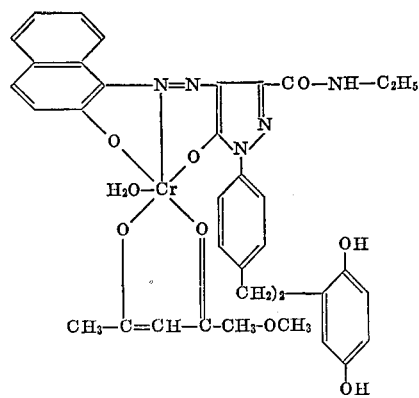
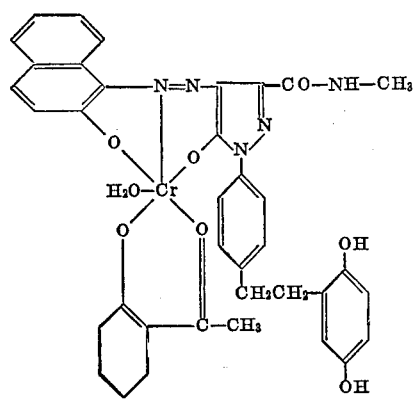
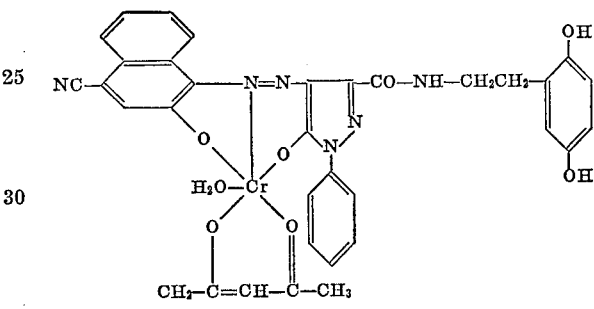
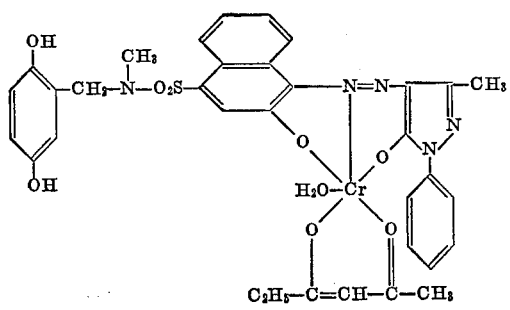
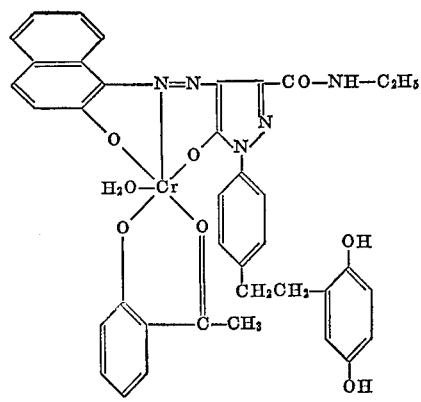
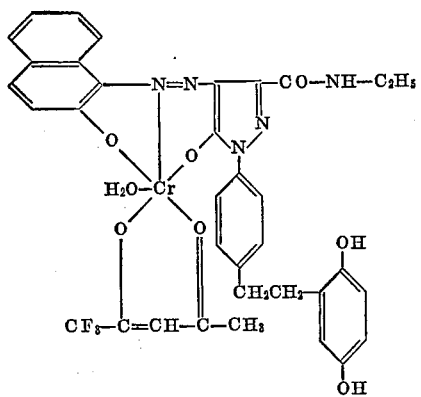
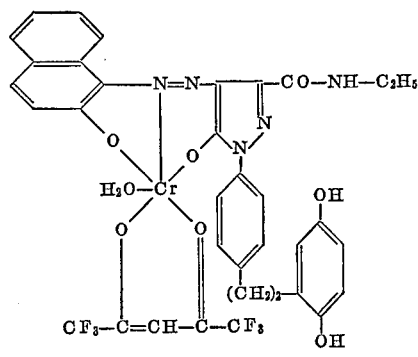

and

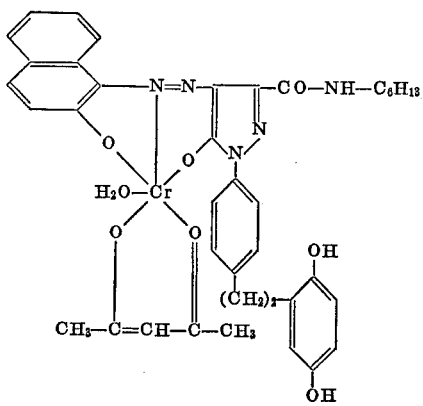

8. A photographic process which comprises exposing a photosensitive silver halide emulsion and developing said exposed silver halide emulsion with an aqueous alkaline composition containing a compound selected from the group consisting of 1:1 chrome-complexed dye developers within the formulae:

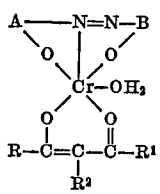

and

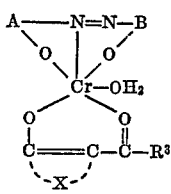

wherein

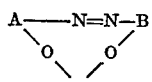

is the radical of an ortho, ortho'-dihydroxy azo dye of the formula:

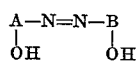

A is an aromatic radical selected from the group consisting of phenyl and naphthyl radicals; B is selected from the group consisting of aromatic and heterocyclic azo coupler radicals at least one of said A and B moieties containing a silver halide developing radical; X represents the atoms necessary to complete a member of the group consisting of aliphatic, aromatic and heterocyclic rings; R and $R^1$ are each selected from the group consisting of alkyl, fluoroalkyl, alkoxyalkyl, aryl and phenylamino radicals; $R^2$ is selected from the group consisting of hydrogen and alkyl and phenyl radicals; and $R^3$ is selected from the group consisting of hydrogen and lower alkyl and hydroxyl radicals, provided that when X represents the atoms necessary to complete an aromatic ring, $R^3$ is selected from the group consisting of hydrogen and lower alkyl radicals.

9. A 1:1 chrome-complexed dye developer as defined in claim 8 selected from the group consisting of:

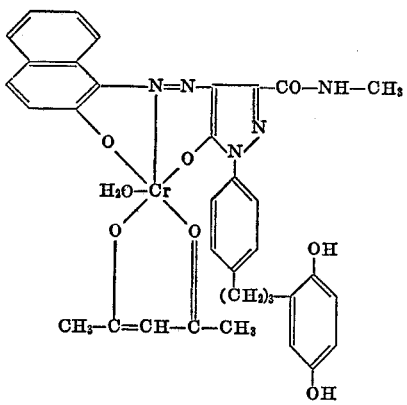

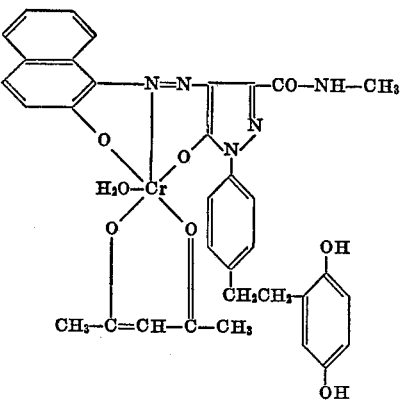

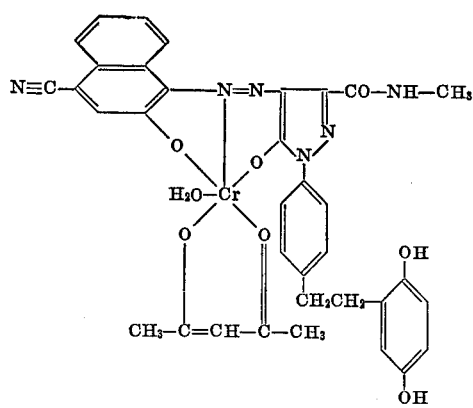

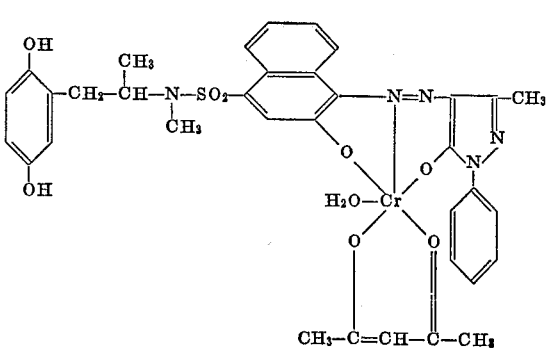

39 40
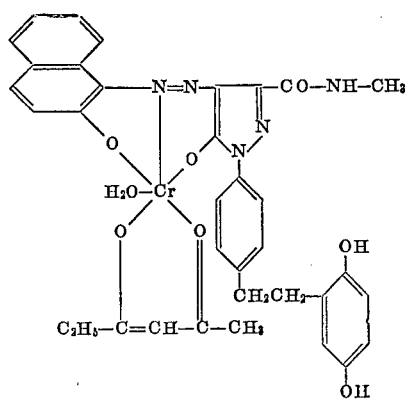
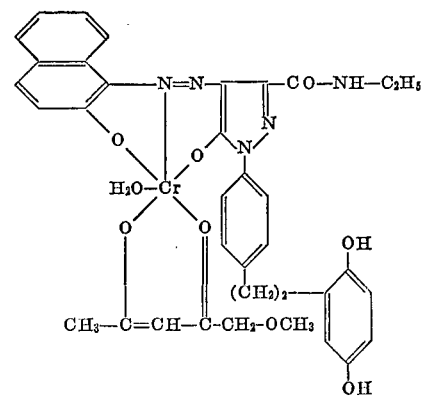
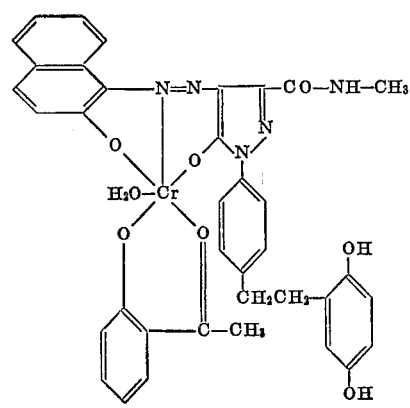
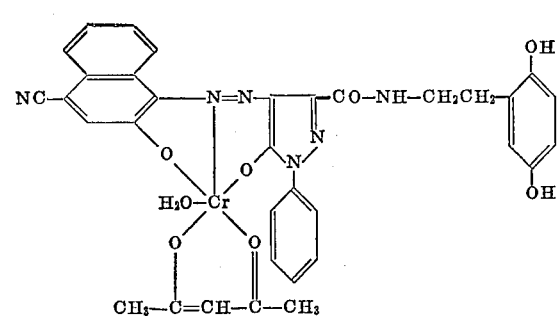
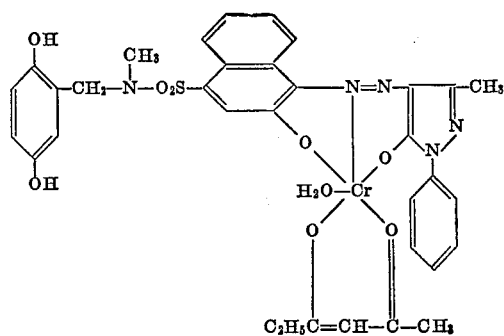
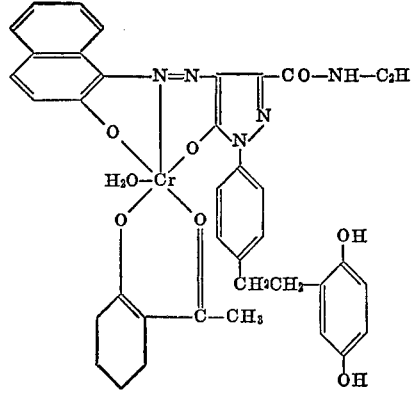
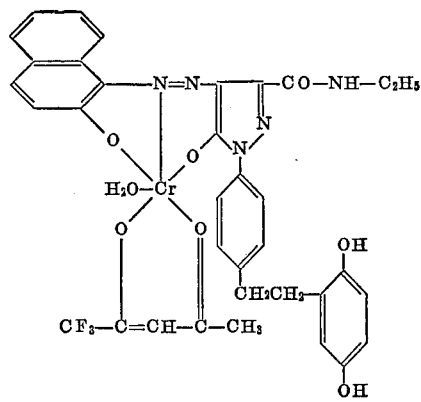
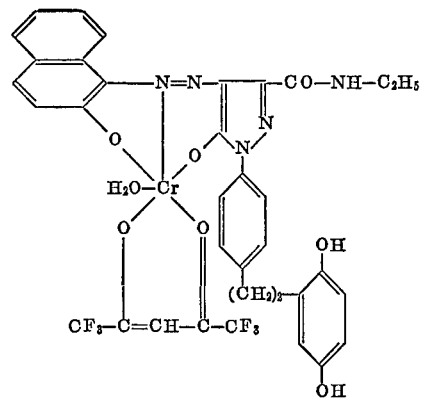

and

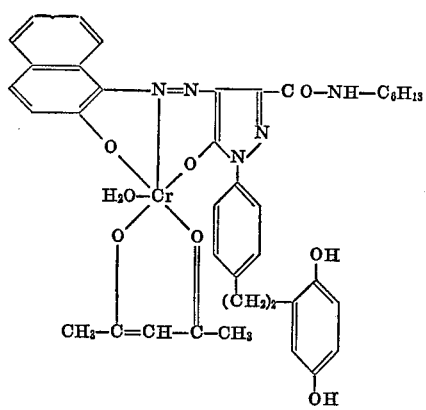

10. In a process of forming photographic images in color, the steps which comprise developing an exposed silver halide emulsion with an aqueous alkaline composition containing a compound selected from the group consisting of 1:1 chrome-complexed dye developers within the formulae:

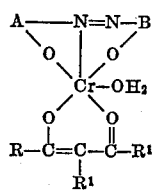

and

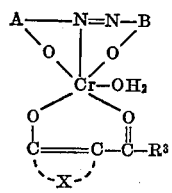

wherein

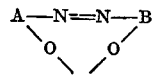

is the radical of an ortho, ortho'-dihydroxy azo dye of the formula:

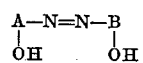

A is an aromatic radical selected from the group consisting of phenyl and naphthyl radicals; B is selected from the group consisting of aromatic and heterocyclic azo coupler radicals at least one of said A and B moieties containing a silver halide developing radical; X represents the atoms necessary to complete a member of the group consisting of aliphatic, aromatic and heterocyclic rings; R and $R^1$ are each selected from the group consisting of alkyl, fluoroalkyl, alkoxyalkyl, aryl and phenylamino radicals; $R^2$ is selected from the group consisting of hydrogen and alkyl and alkyl and phenyl radicals; and $R^3$ is selected from the group consisting of hydrogen and lower alkyl and hydroxyl radicals, provided that when X represents the atoms necessary to complete an aromatic ring, $R^3$ is selected from the group consisting of hydrogen and lower alkyl radicals; oxidizing said dye developer as a function of development to provide a predetermined distribution of unoxidized dye developer; and transferring at least part of said imagewise distribution of unoxidized dye developer, by imbibition, to a superposed dyeable stratum to form a dye transfer image thereon.

11. A process as defined in claim 10 wherein said complex is one within said first-mentioned formula, and B is a phenyl, naphthyl or pyrazolyl radical.

12. A process as defined in claim 10 wherein said complex is one within said last-mentioned formula, wherein B is a phenyl naphthyl or pyrazolyl radical; X represents the atoms necessary to complete a 5 or 6 member aliphatic ring or a benzene ring; and $R^3$ is hydrogen or methyl, provided that when X represents the atoms necessary to complete a benzene ring, $R^3$ is methyl.

13. A process as defined in claim 12 wherein said 1:1 chrome-complexed dye developer is selected from the group consisting of:

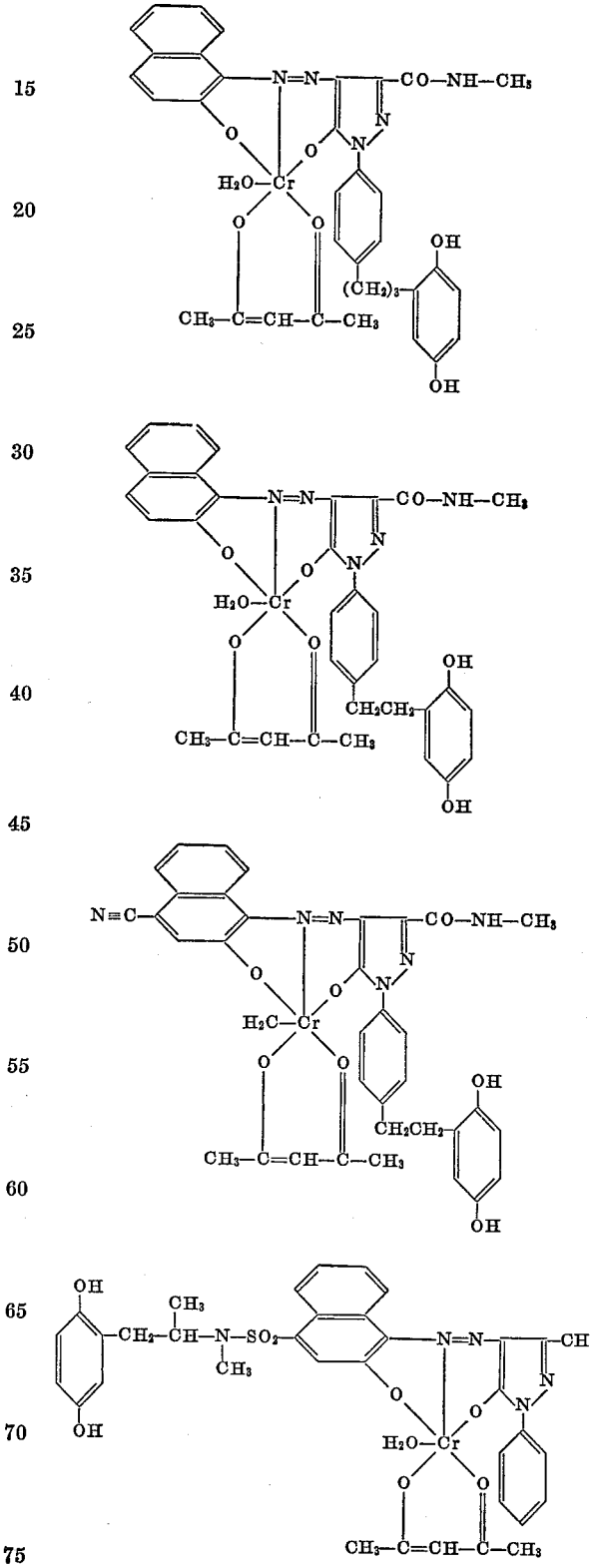

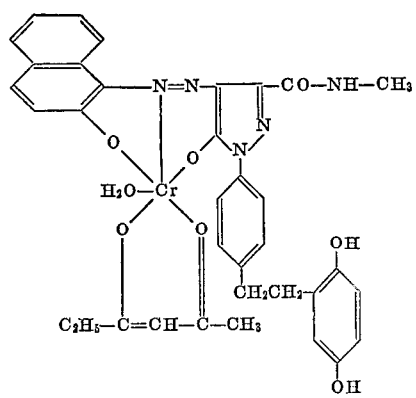
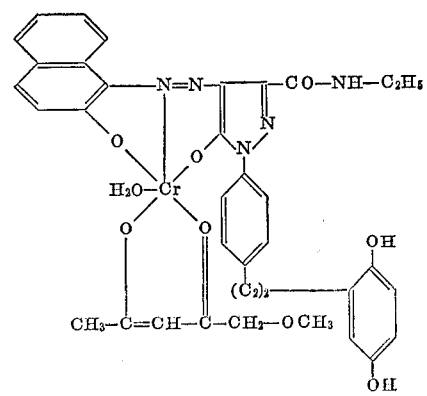
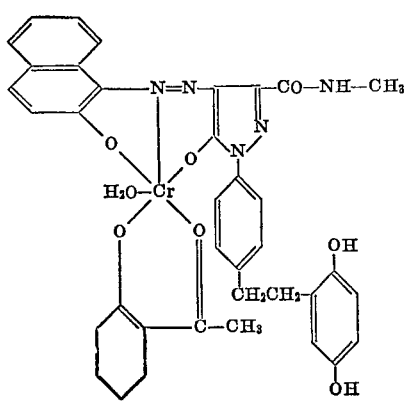
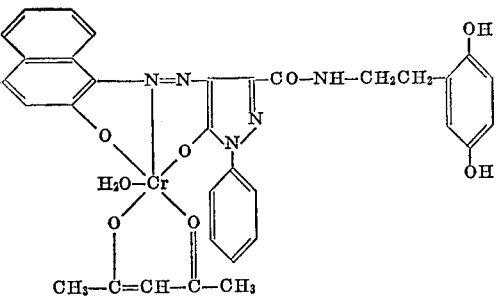
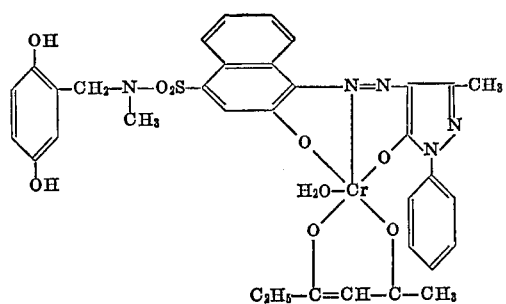
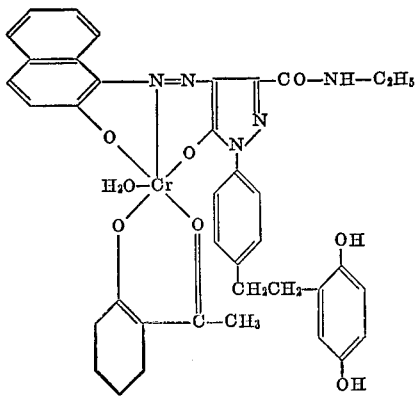
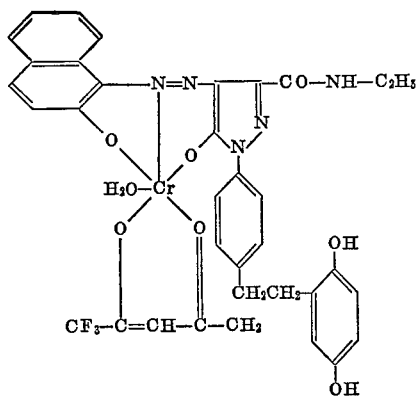
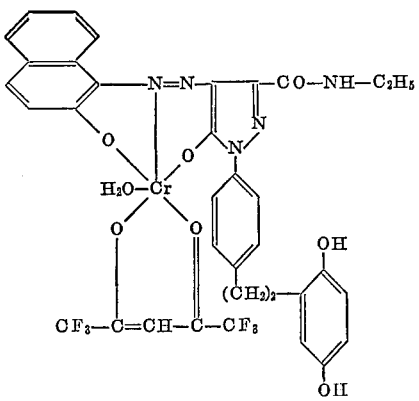

and

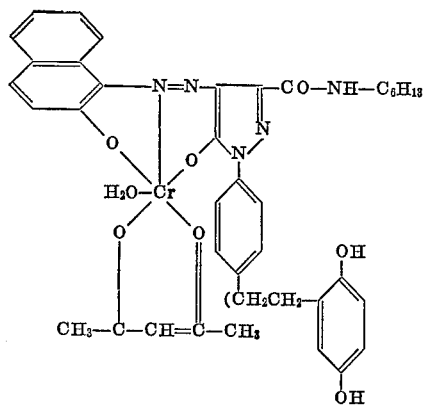

14. A photographic developer composition comprising an aqueous alkaline solution of a substantially colorless silver halide auxiliary developing agent and a dye developer of the formula:

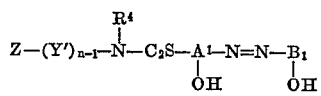

where —A¹— is a naphthylene radical;

is a 5-pyrazolone radical, one nitrogen atom of said azo linkage being bonded to a carbon atom of the naphthylene nucleus ortho to the hydroxy substituent thereof, the other nitrogen atom of said linkage being bonded to the pyrazole nucleus in the 4 position; $R^4$ is a member of the group consisting of hydrogen and methyl; Y′ is a member of the group consisting of phenylene, phenalkylene and alkylene radicals, said alkylene moiety containing from 1-5 carbon atoms; $n$ is a positive integer from 1 to 2; and Z is a p-dihydroxyphenyl silver halide developing radical.

15. A composition as defined in claim 14 wherein said dye developer is selected from the group consisting of:

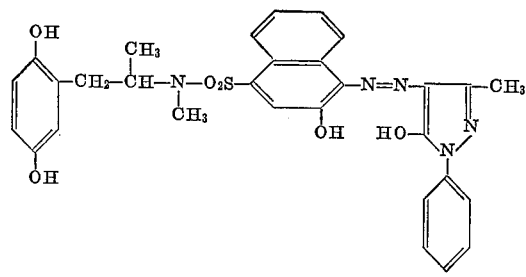

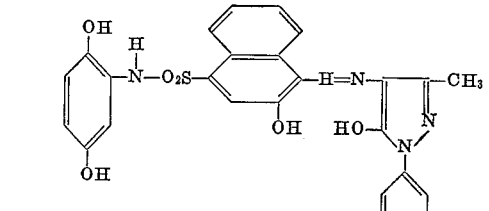

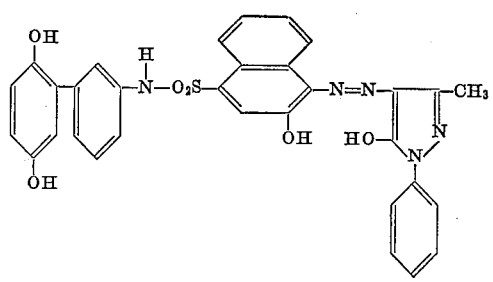

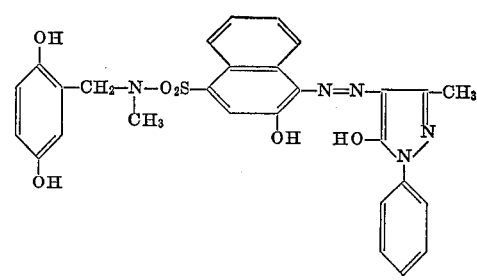

16. A photographic developer composition comprising an aqueous alkaline solution of a substantially colorless silver halide auxiliary developing agent and a dye developer of the formula:

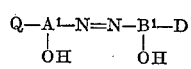

wherein, —A¹— is a naphthylene radical;

is the divalent radical of a 5-pyrazolone, one nitrogen atom of said azo linkage being bonded to a carbon atom of the naphthylene nucleus ortho to the hydroxy substituent thereof, the other nitrogen atom of said azo linkage being bonded to the pyrazolone nucleus in the 4-

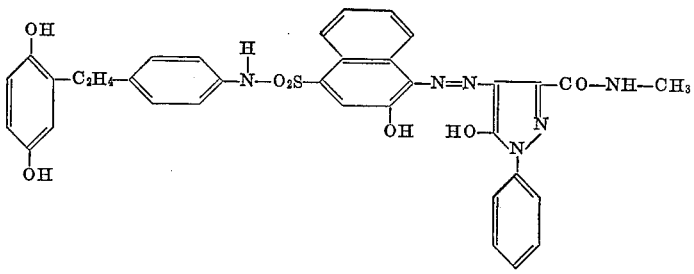

position; Q is a member of the group consisting of cyano and substituents of the formula:

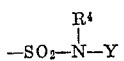

wherein $R^4$ is a member of the group consisting of hydrogen and methyl and Y is an alkyl radical containing 1 to 5 carbon atoms provided that when $R^4$ is methyl, said $R^4$ and Y moieties together may comprise the carbon atoms necessary to form one of a 5 and 6 member ring; and D is a radical comprising a p-dihydroxyphenyl silver halide developing substituent, said radical D being bonded to an atom of the pyrazolone nucleus in one of the 1 and 3 positions.

17. A composition as defined in claim 14 wherein said dye developer is selected from the group consisting of:

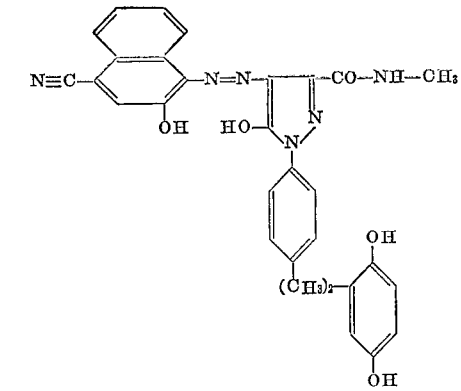

and

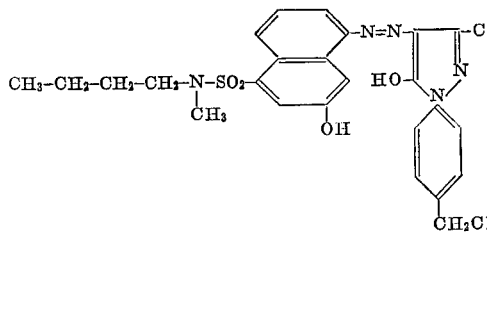

18. A photographic product comprising a support, a silver halide emulsion in a layer on said support and a dye developer in a layer on the same side of said support as said emulsion, said dye developer being of the formula:

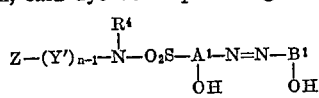

wherein —$A^1$— is a naphthylene radical;

is a 5-pyrazolone radical, one nitrogen atom of said azo linkage being bonded to a carbon atom of the naphthylene nucleus ortho to the hydroxy substituent thereof, the other nitrogen atom of said linkage being bonded to the pyrazolone nucleus in the 4 position; $R^4$ is a member of the group consisting of hydrogen and methyl; Y′ is a member of the group consisting of phenylene, phenalkylene and alkylene radicals, said alkylene moiety containing from 1–5 carbon atoms; $n$ is a positive integer from 1 to 2; and Z is a p-dihydroxyphenyl silver halide developing radical.

19. A product as defined in claim 18 wherein said dye developer is selected from the group consisting of:

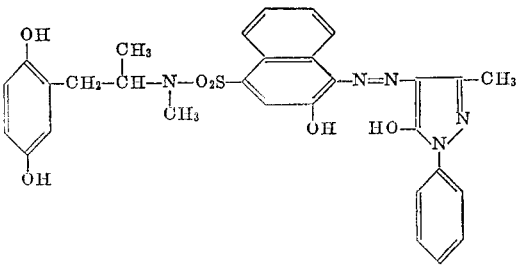

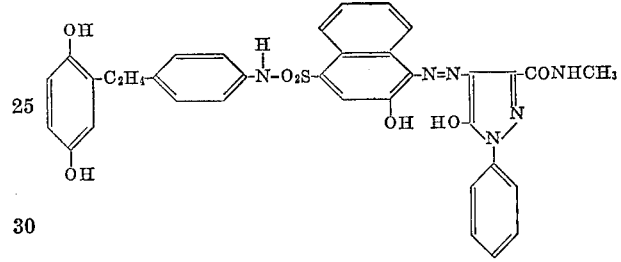

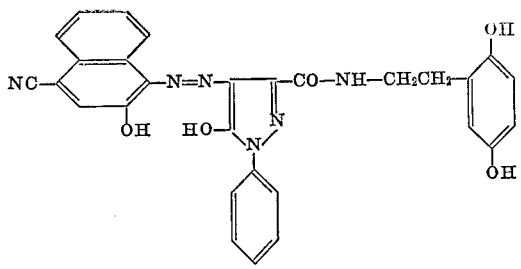

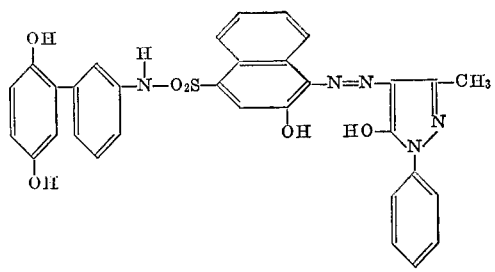

and

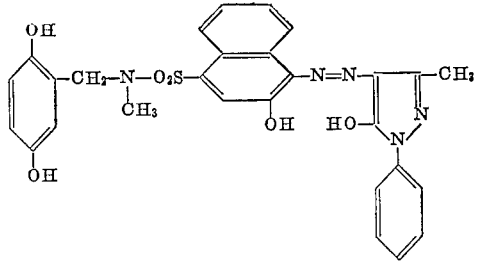

20. A photographic product comprising a support, a silver halide emulsion in a layer on said support and a dye developer in a layer on the same side of support as said emulsion, said dye developer being of the formula:

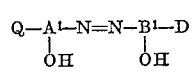

wherein —A¹— is a naphthylene radical;

is the divalent radical of a 5-pyrazolone, one nitrogen atom of said azo linkage being bonded to a carbon atom of the naphthylene nucleus ortho to the hydroxy substituent thereof, the other nitrogen atom of said azo linkage being bonded to the pyrazolone nucleus in the 4 position; Q is a member of the group consisting of cyano and substituents of the formula:

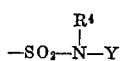

wherein $R^4$ is a member of the group consisting of hydrogen and methyl and Y is an alkyl radical containing 1 to 5 carbon atoms provided that when $R^4$ is methyl, said $R^4$ and Y moieties together comprise the carbon atoms necessary to form one of a 5 and 6 member ring; and D is a radical comprising a p-dihydroxyphenyl silver halide developing substituent, said radical D being bonded to an atom of the pyrazolone nucleus in one of the 1 and 3 positions.

21. A product as defined in claim 18 wherein said dye developer is selected from the group consisting of:

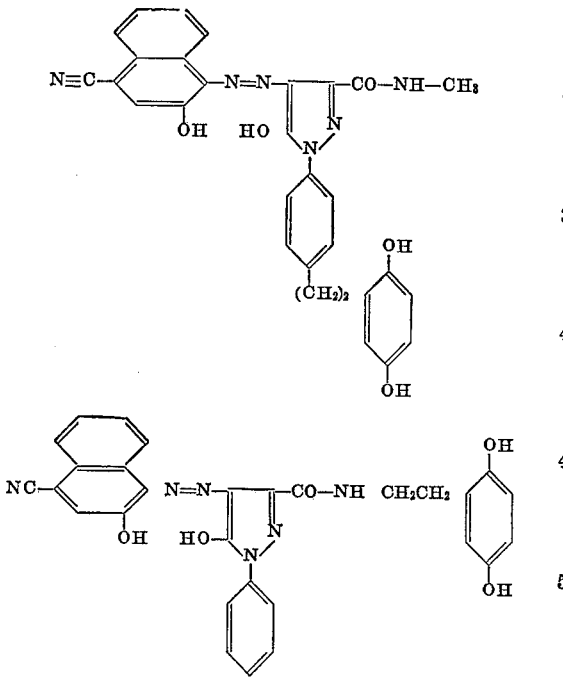

and

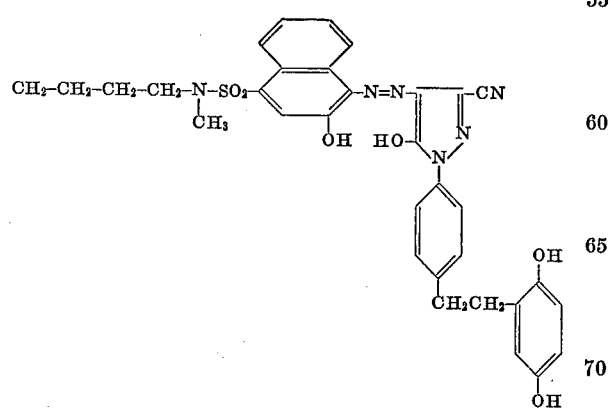

22. A photographic process which comprises exposing a photosensitive silver halide emulsion and developing said exposed silver halide emulsion with an aqueous alkaline composition containing a dye developer of the formula:

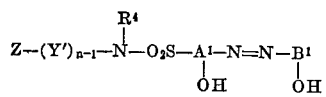

wherein —A¹— is a naphthylene radical;

is a pyrazolone radical; one nitrogen atom of said azo linkage being bonded to a carbon atom of the naphthylene nucleus ortho to the hydroxy substituent thereof, the other nitrogen atom of said azo linkage being bonded to the pyrazolone nucleus in the 4 position; $R^4$ is a member of the group consisting of hydrogen and methyl; Y' is a member of the group consisting of phenylene, phenalkylene and alkylene radicals, said alkylene moiety containing from 1–5 carbon atoms; n is a positive integer from 1 to 2; and Z is a p-dihydroxyphenyl silver halide developing radical.

23. A process as defined in claim 22 wherein said dye developer is selected from the group consisting of:

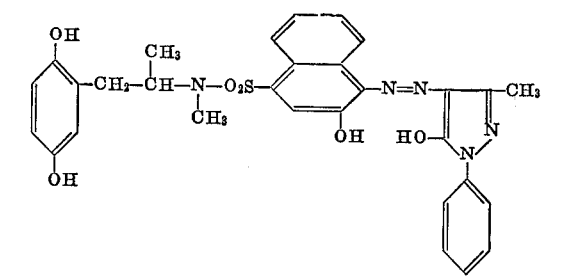

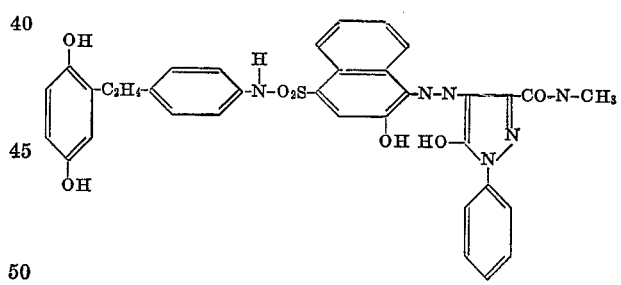

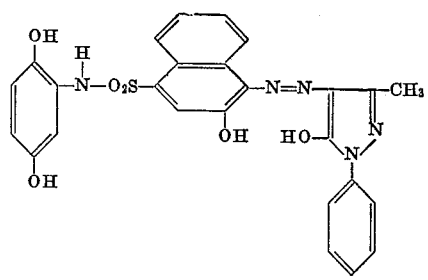

3,453,107 and

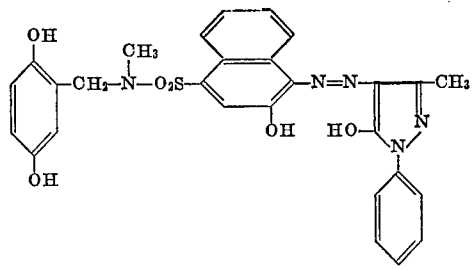

and

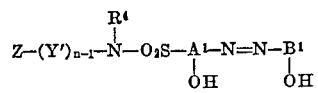

24. A photographic process which comprises exposing a photosensitive silver halide emulsion and developing said exposed silver halide emulsion with an aqueous alkaline composition containing a dye developer of the formula:

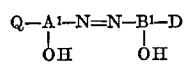

wherein —$A^1$— is a naphthylene radical;

is the divalent radical of a 5-pyrazolone, one nitrogen atom of said azo linkage being bonded to a carbon atom of the naphthylene nucleus ortho to the hydroxy substituent thereof, the other nitrogen atom of said azo linkage being bonded to the pyrazolone nucleus in the 4 position; Q is a member of the group consisting of cyano and substituents of the formula:

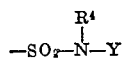

wherein $R^4$ is a member of the group consisting of hydrogen and methyl and Y is an alkyl radical containing 1 to 5 carbon atoms provided that when $R^4$ is methyl, said $R^4$ and Y moieties together may comprise the carbon atoms necessary to form one of a 5 and 6 member ring; and D is a radical comprising a p-dihydroxyphenyl silver halide developing substituent, said radical D being bonded to an atom of the pyrazolone nucleus in one of the 1 and 3 positions.

25. A process as defined in claim 22 wherein said dye developer is selected from the group consisting of:

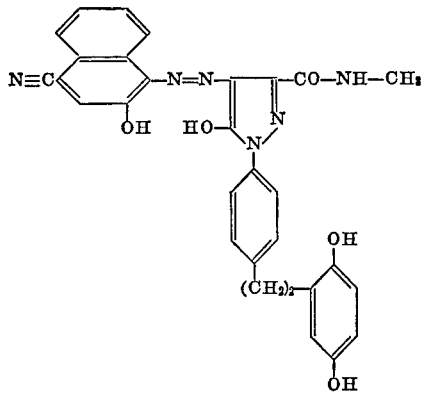

26. In a process of forming photographic images in color, the steps which comprise developing an exposed silverhalide emulsion with an aqueous alkaline composition containing a dye developer of the formula:

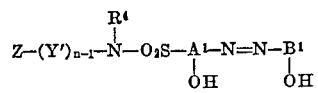

wherein —$A^1$— is a naphthylene radical;

is a 5-pyrazolone radical, one nitrogen atom of said azo linkage being bonded to a carbon atom of the naphthylene nucleus ortho to the hydroxy substituent thereof, the other nitrogen atom of said linkage being bonded to the pyrazolone nucleus in the 4 position; $R^4$ is a member of the group consisting of hydrogen and methyl; Y' is a member of the group consisting of phenylene, phenalkylene and alkylene radicals, said alkylene moiety containing from 1–5 carbon atoms; n is a positive integer from 1 to 2; and Z is a p-dihydroxyphenyl silver halide developing radical; oxidizing said dye developer in developed areas as a function of development to provide a predetermined distribution of unoxidized dye developer; and transferring at least part of said imagewise distribution of unoxidized dye developer, by imbibition, to a superposed dyeable stratum to form a dye transfer image therein.

27. A process as defined in claim 26 wherein said dye developer is selected from the group consisting of:

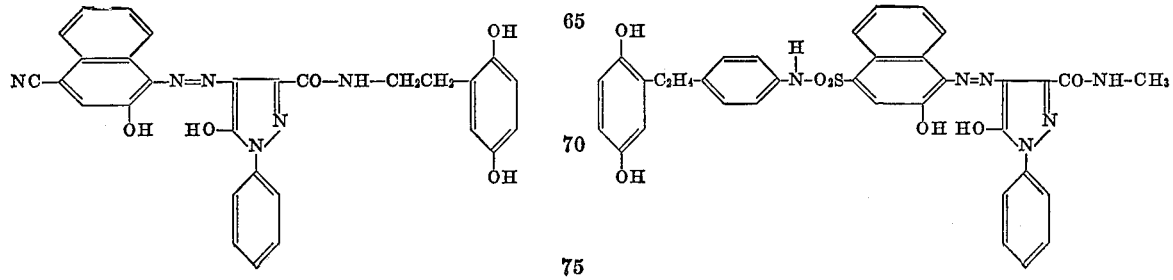

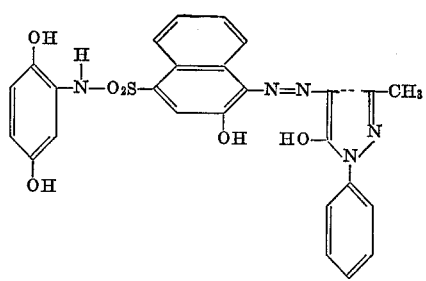

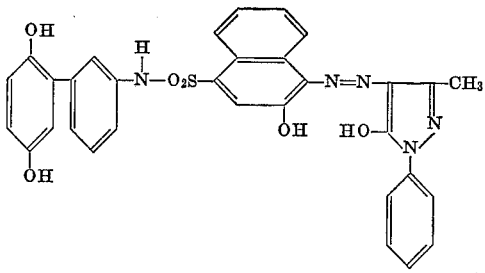

and

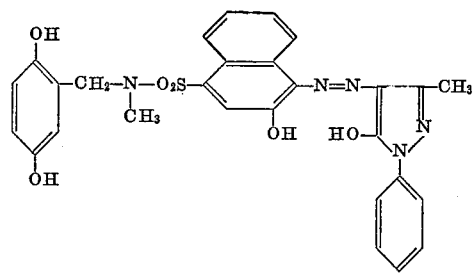

28. In a process of forming photographic images in color, the steps which comprise developing an exposed silver halide emulsion with an aqueous alkaline composition containing a dye developer of the formula:

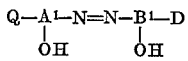

wherein —A¹— is a naphthylene radical;

is the divalent radical of a 5-pyrazolone, one nitrogen atom of said azo linkage being bonded to a carbon atom of the naphthylene nucleus ortho to the hydroxy substituent thereof, the other nitrogen atom of said azo linkage being bonded to the pyrazolone nucleus in the 4 position; Q is a member of the group consisting of cyano and substituents of the formula:

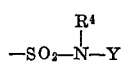

wherein R⁴ is a member of the group consisting of hydrogen and methyl and Y is an alkyl radical containing 1 to 5 carbon atoms, provided that when R⁴ is methyl, said R⁴ and Y moieties together may comprise the carbon atoms necessary to form one of a 5 and 6 member ring; and D is a radical comprising a p-dihydroxyphenyl silver halide developing substituent, said radical D being bonded to an atom of the pyrazolone nucleus in one of the 1 and 3 positions; oxidizing said dye developer in developed areas as a function of development to provide a predetermined distribution of unoxidized dye developer; and transferring at least part of said imagewise distribution of unoxidized dye developer, by imbibition, to a superposed dyeable stratum to form a dye transfer image thereon.

29. A process as defined in claim 28 wherein said dye developer is selected from the group consisting of:

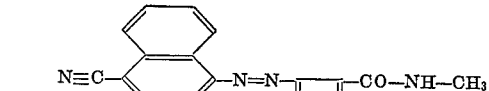

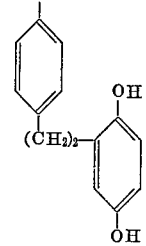

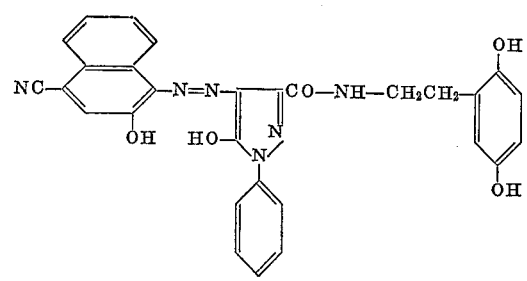

and

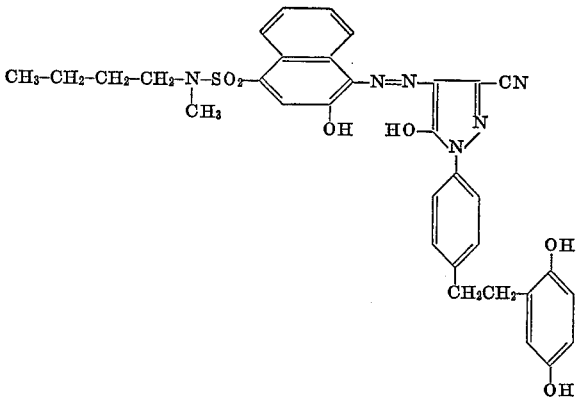

References Cited

UNITED STATES PATENTS 3,218,164   11/1965   Green et al. _____ 96—29

NORMAN G. TORCHIN, *Primary Examiner.*

A. T. SURO PICO, *Assistant Examiner.*

U.S. Cl. X.R.

96—3

UNITED STATES PATENT OFFICE
CERTIFICATE OF CORRECTION

Patent No. 3,453,107　　　　　　　Dated July 1, 1969

Inventor(s)　Elbert M. Idelson　　　　　　PAGE - 1

It is certified that error appears in the above-identified patent and that said Letters Patent are hereby corrected as shown below:

Column 4, Formula (4) should be

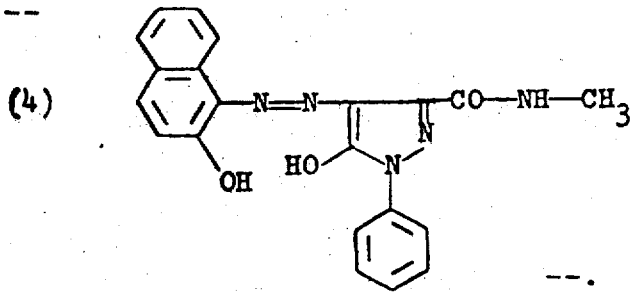

Column 11, Formula (43) should be

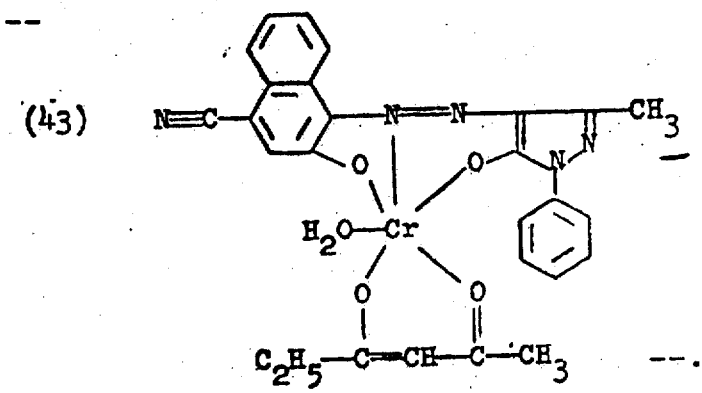

FORM PO-1050 (10-69)

UNITED STATES PATENT OFFICE
CERTIFICATE OF CORRECTION

Patent No. 3,453,107  Dated July 1, 1969

Inventor(s) Elbert M. Idelson  PAGE - 2

It is certified that error appears in the above-identified patent and that said Letters Patent are hereby corrected as shown below:

Column 17, line 63 should be

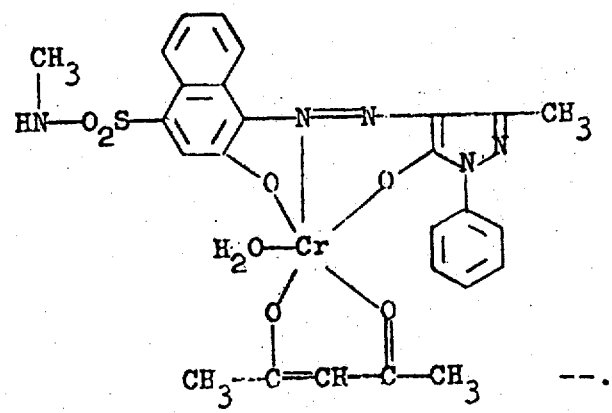

Column 18, line 75 should be

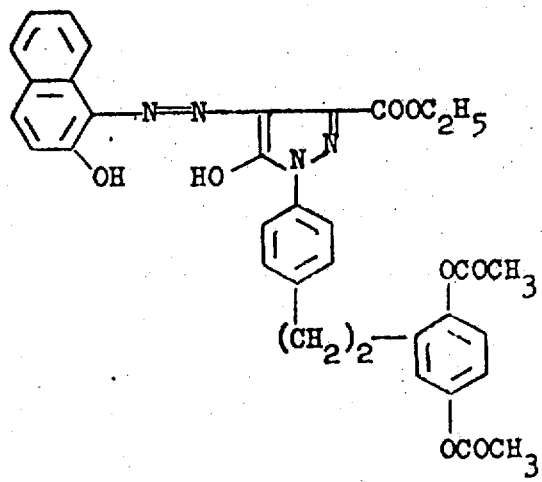

UNITED STATES PATENT OFFICE
CERTIFICATE OF CORRECTION

Patent No. 3,453,107          Dated July 1, 1969

Inventor(s)   Elbert M. Idelson          PAGE - 3

It is certified that error appears in the above-identified patent and that said Letters Patent are hereby corrected as shown below:

Column 21, line 20 should be

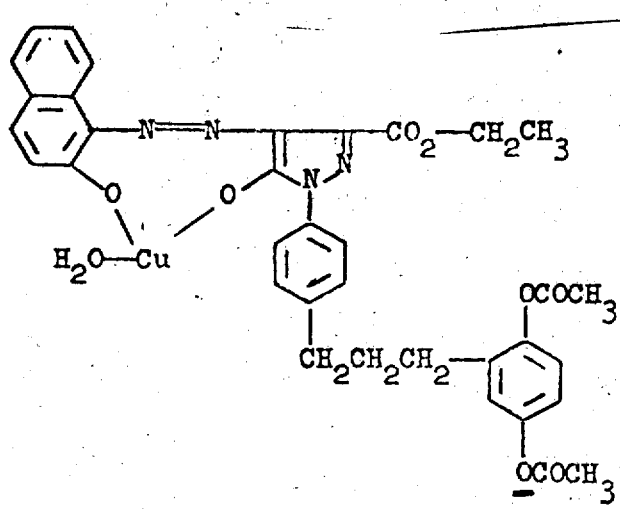

Column 25, line 10 should be

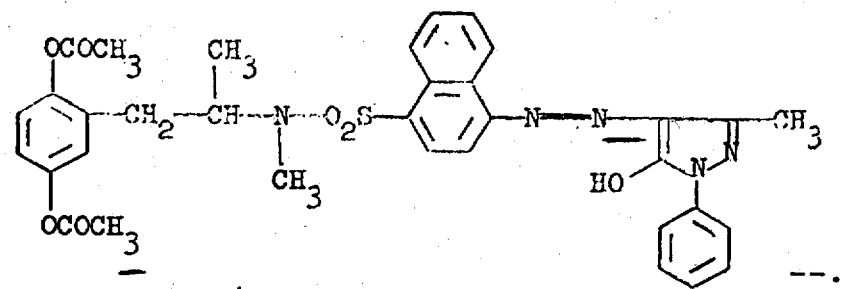

Column 30, line 39, "345,163" should read -- 3,345,163 --.

UNITED STATES PATENT OFFICE
CERTIFICATE OF CORRECTION

Patent No. 3,453,107            Dated July 1, 1969

Inventor(s)    Elbert M. Idelson            PAGE - 4

It is certified that error appears in the above-identified patent and that said Letters Patent are hereby corrected as shown below:

Column 34, claim 7, formula 4), should be

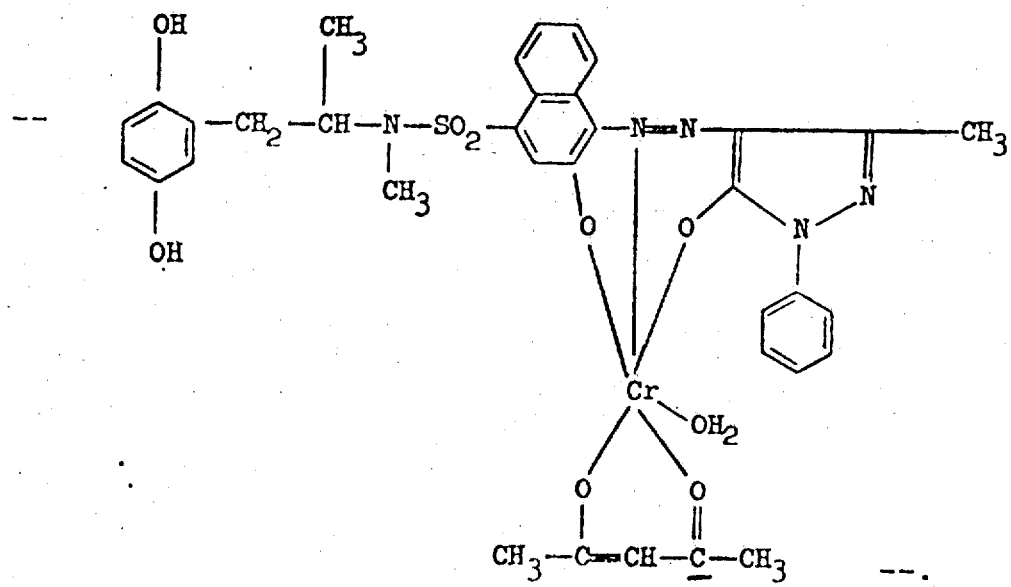

FORM PO-1050 (10-69)

UNITED STATES PATENT OFFICE
CERTIFICATE OF CORRECTION

Patent No. 3,453,107     Dated July 1, 1969

Inventor(s) Elbert M. Idelson     PAGE - 5

It is certified that error appears in the above-identified patent and that said Letters Patent are hereby corrected as shown below:

Column 35, claim 7, formula 5), should be

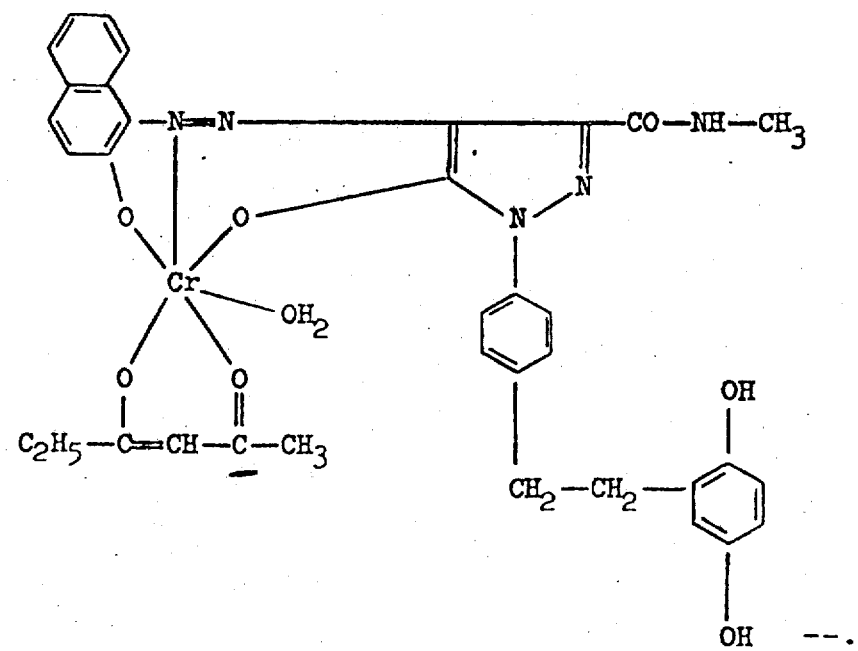

UNITED STATES PATENT OFFICE
CERTIFICATE OF CORRECTION

Patent No. 3,453,107                    Dated July 1, 1969

Inventor(s)          Elbert M. Idelson                PAGE - 6

It is certified that error appears in the above-identified patent and that said Letters Patent are hereby corrected as shown below:

Column 36, claim 7, formula 9), should be

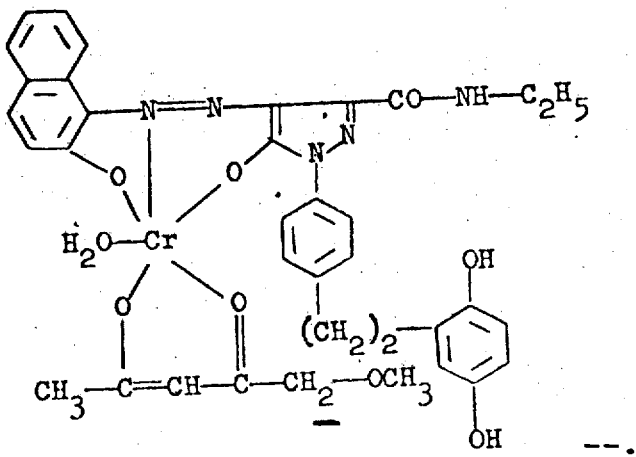

Column 36, claim 7, formula 10), should be

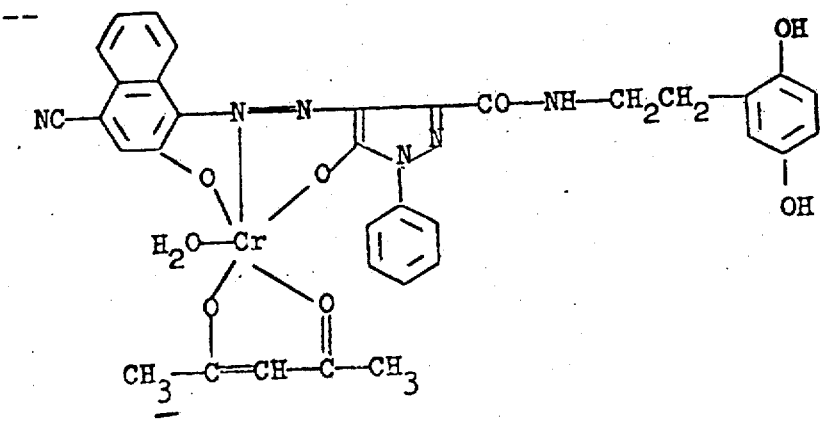

FORM PO-1050 (10-69)

UNITED STATES PATENT OFFICE
CERTIFICATE OF CORRECTION

Patent No. 3,453,107           Dated July 1, 1969

Inventor(s)       Elbert M. Idelson       PAGE - 7

It is certified that error appears in the above-identified patent and that said Letters Patent are hereby corrected as shown below:

Column 40, claim 9, formula 11), should be

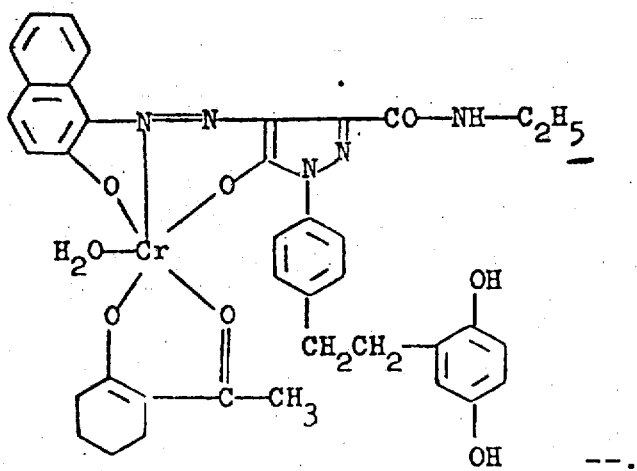

Column 42, claim 13, formula 3 should be

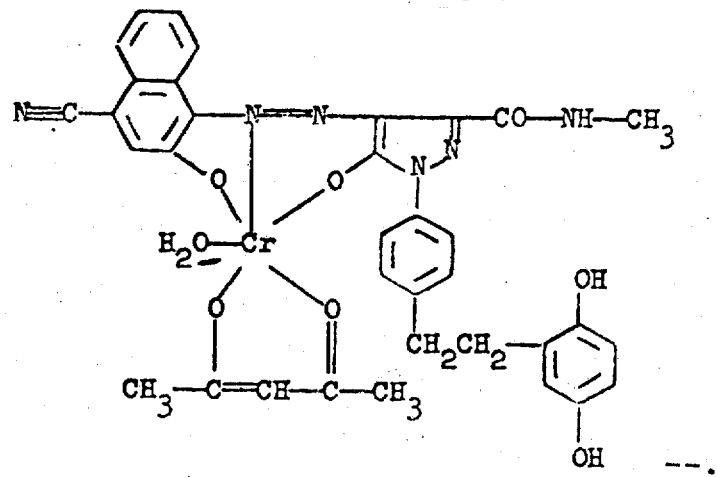

UNITED STATES PATENT OFFICE
CERTIFICATE OF CORRECTION

Patent No. 3,453,107        Dated July 1, 1969

Inventor(s) Elbert M. Idelson        PAGE - 8

It is certified that error appears in the above-identified patent and that said Letters Patent are hereby corrected as shown below:

Column 43, claim 13, formula 8 should be

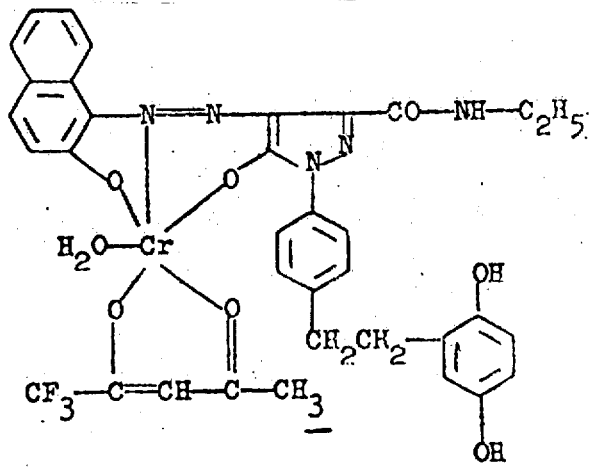

Column 45, claim 14, line 25 should be

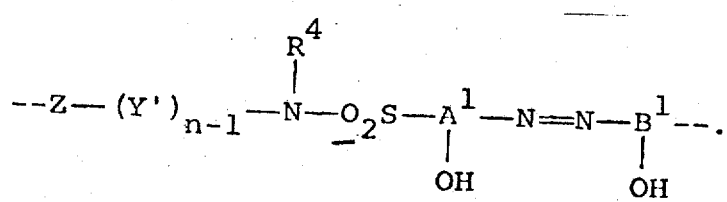

UNITED STATES PATENT OFFICE
CERTIFICATE OF CORRECTION

Patent No. 3,453,107                             Dated July 1, 1969

Inventor(s)      Elbert M. Idelson               PAGE - 9

It is certified that error appears in the above-identified patent and that said Letters Patent are hereby corrected as shown below:

Column 46, claim 15, formula 3                 should be

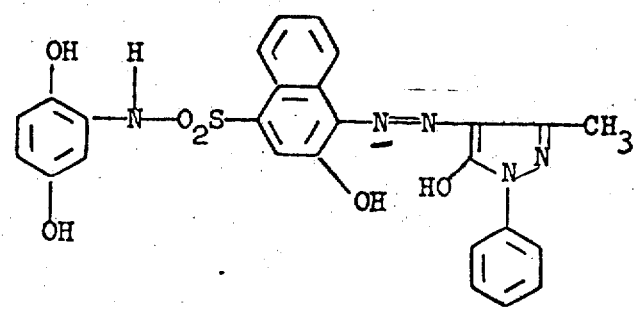

Column 47, claim 17, formula 1 should be

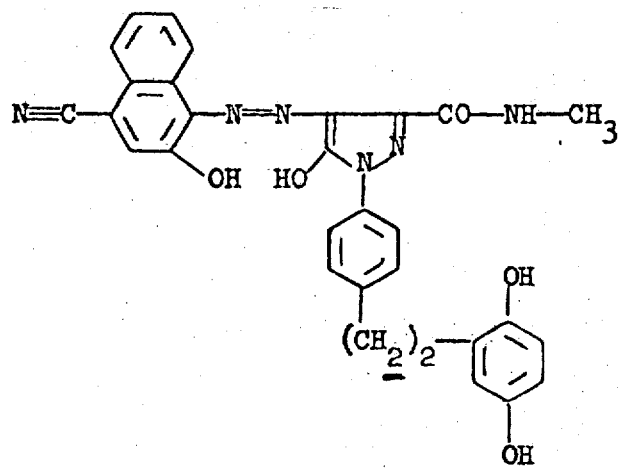

FORM PO-1050 (10-69)

UNITED STATES PATENT OFFICE
CERTIFICATE OF CORRECTION

Patent No. 3,453,107      Dated July 1, 1969

Inventor(s) Elbert M. Idelson      PAGE - 10

It is certified that error appears in the above-identified patent and that said Letters Patent are hereby corrected as shown below:

Column 49, claim 21, formula 3 should be

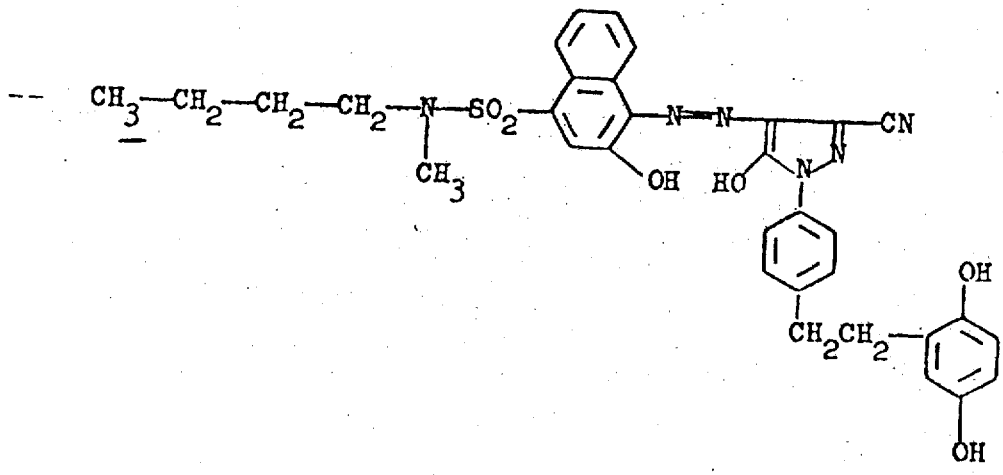

Column 50, claim 23, formula 2 should be

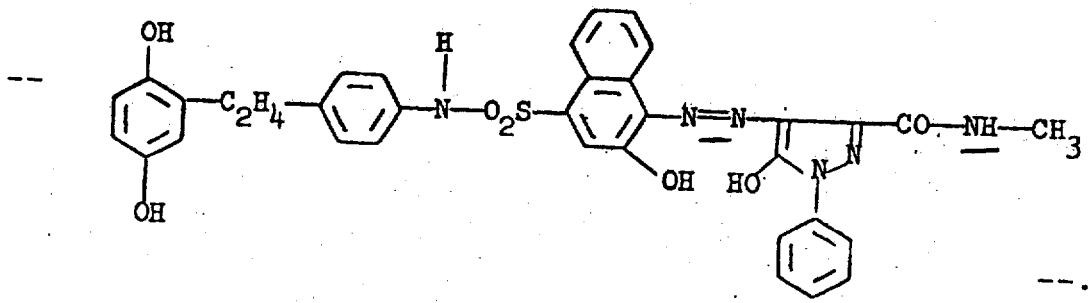

UNITED STATES PATENT OFFICE
CERTIFICATE OF CORRECTION

Patent No. 3,453,107         Dated July 1, 1969

Inventor(s)    Elbert M. Idelson         Page - 11

It is certified that error appears in the above-identified patent and that said Letters Patent are hereby corrected as shown below:

Column 50, claim 23, formula 4 should be

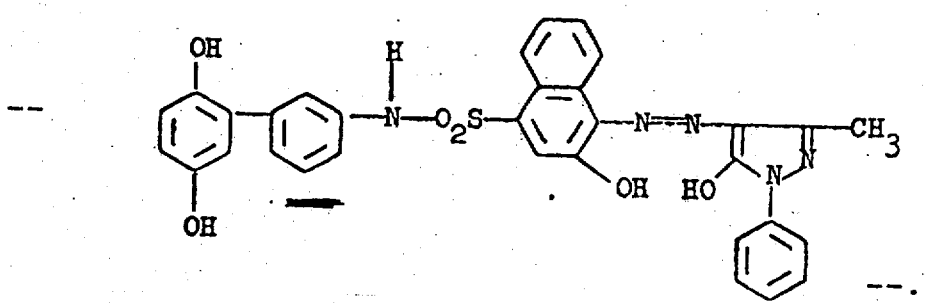

Signed and sealed this 14th day of March 1972.

(SEAL)
Attest:

EDWARD M. FLETCHER, JR.
Attesting Officer

ROBERT GOTTSCHALK
Commissioner of Patents